United States Patent [19]
Muraji

[11] Patent Number: 5,907,202
[45] Date of Patent: *May 25, 1999

[54] THERMO-SENSITIVE ACTUATOR AND IDLE SPEED CONTROLLER EMPLOYING THE SAME

[75] Inventor: Tetsuo Muraji, Odawara, Japan

[73] Assignee: Mikuni Corporation, Tokyo, Japan

[ * ] Notice: This patent is subject to a terminal disclaimer.

[21] Appl. No.: 08/968,593

[22] Filed: Nov. 13, 1997

Related U.S. Application Data

[62] Division of application No. 08/519,874, Aug. 28, 1995, Pat. No. 5,742,106.

[51] Int. Cl.$^6$ .................................................. H02K 33/02
[52] U.S. Cl. ........................... 310/36; 310/306; 310/209; 310/190
[58] Field of Search .................................... 310/306, 209, 310/190, 191, 36; 335/217, 218, 146

[56] References Cited

U.S. PATENT DOCUMENTS

| | | |
|---|---|---|
| 3,760,310 | 9/1973 | Carson ..................................... 335/146 |
| 5,220,223 | 6/1993 | Mehnert ..................................... 310/14 |

FOREIGN PATENT DOCUMENTS

| | | |
|---|---|---|
| 59-170441 | 9/1984 | Japan . |
| 1-28286 | 8/1989 | Japan . |
| 5-34518 | 5/1993 | Japan . |

*Primary Examiner*—Mark O. Budd
*Attorney, Agent, or Firm*—Varndell Legal Group

[57] ABSTRACT

A thermo-sensitive actuator capable of operating without the need of providing a temperature detector as a separate member. The actuator includes a stator made of a magnetic material to form a yoke. A rotor is rotatably provided in an opening provided in the stator. The actuator further includes pole pieces for magnetically connecting the stator and the rotor. A magnetic source is provided in any of the magnetic paths formed by the constituent elements. A thermo-sensitive magnetic material, which shows a change in magnetic characteristics, e.g. permeability, saturated magnetic flux density, or residual magnetic flux density, according to temperature, is provided in a part of the magnetic paths.

11 Claims, 21 Drawing Sheets

THERMO-SENSITIVE ACTUATOR AND IDLE SPEED CONTROLLER EMPLOYING THE SAME

CROSS-REFERENCE TO RELATED APPLICATION

This application is a divisional application of U.S. Ser. No. 08/519,874, filed Aug. 28, 1995, now U.S. Pat. No. 5,742,106.

BACKGROUND OF THE INVENTION

The present invention relates to a thermo-sensitive actuator which generates driving force upon detecting a temperature change in an environment or a specific apparatus. The present invention also relates to an idle speed controller (hereinafter referred to as "ISC") which employs the thermo-sensitive actuator.

In some controlled systems, response conditions for control are desired to change in accordance with a temperature change in an environment or an apparatus. For example, there is an ISC mounted on an automobile. In this case, when the automobile is in an idling state, the intake air quantity is affected by the engine temperature.

Accordingly, temperature sensors are attached to necessary positions, and detected signals from the temperature sensors are collected to obtain control conditions. As specific temperature sensors, various types of sensor have already been proposed, such as those which employ wax, and those which employ a bimetal.

A specific example of changing response conditions of an apparatus in accordance with a temperature change will be explained below with regard to an automobile which is in an idling state. In the case of an automotive internal combustion engine, when the engine temperature is high, the bypass air quantity must be reduced, whereas, when the engine temperature is low, the bypass air quantity must be increased. In the case of a heater or similar device, when the temperature is low, it is necessary to increase the opening of the fuel valve to thereby increase the heat generation rate. In other words, a valve body for an ISC is required to move in such a manner that, when the temperature is low, the valve body moves with a large stroke, whereas, when the temperature is high, the valve body moves with a small stroke near the position for closing the valve to prevent runaway. FIG. 1 is a graph showing characteristics required for a rotary actuator for controlling the valve body of an ISC, in which temperature T [° C.] is plotted along the abscissa axis, and stroke [deg] is plotted along the ordinate axis.

Accordingly, this type of control requires a plurality of temperature sensors or temperature-sensing actuators and also needs to constitute a control circuit taking into account temperature conditions. Consequently, the structure of the controller becomes complicated, and the reliability degrades. Further, as the number of constituent elements increases, the production cost rises.

With regard to control conditions, some valves as objects to be driven need to be closed (fully closed) irrespective of the temperature when the apparatus is not energized. A fuel valve used in a heater, for example, comes under this category. In this case, when the apparatus is in an inoperative state, the fuel valve must be fully closed to prevent fuel from flowing out.

SUMMARY OF THE INVENTION

An object of the present invention is to provide a thermo-sensitive actuator in which a thermo-sensitive magnetic material whose magnetic characteristics change according to temperature is provided in a part of a magnetic path, thereby making it unnecessary to provide a temperature detector as a separate member.

Another object of the present invention is to provide a thermo-sensitive actuator designed so that actuating force can be taken out in accordance with a temperature change by considering in which part of a magnetic path a thermo-sensitive magnetic material should be disposed.

Still another object of the present invention is to provide an ISC capable of controlling an air quantity in a bypass passage, in which an actuator that employs a thermo-sensitive magnetic material is used as a drive source.

A further object of the present invention is to provide a thermo-sensitive actuator designed by considering in which part of a pole piece a thermo-sensitive magnetic material should be provided.

A still further object of the present invention is to provide a thermo-sensitive actuator designed by considering in which part of a magnetic path an air gap should be provided, and also considering where to provide a thermo-sensitive magnetic material.

A still further object of the present invention is to provide a thermo-sensitive actuator which, when not energized, is in a characteristic (normally closed) state where the valve is closed at all times irrespective of the temperature.

DETAILED DESCRIPTION OF THE EMBODIMENTS

Embodiments of the present invention will be described below with reference to the accompanying drawings.

Figure 1:
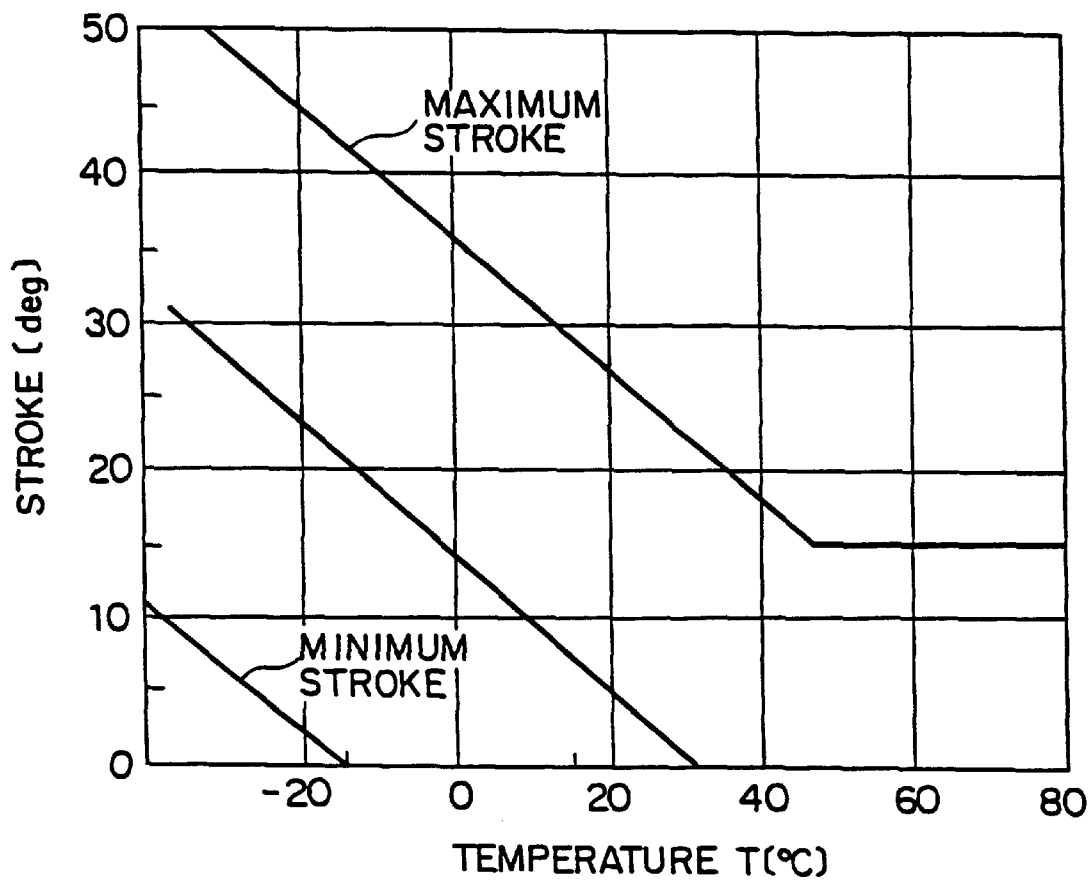
FIG. 1 is a graph showing the characteristics of a rotary actuator for controlling a valve body of an ISC.
Figure 2:
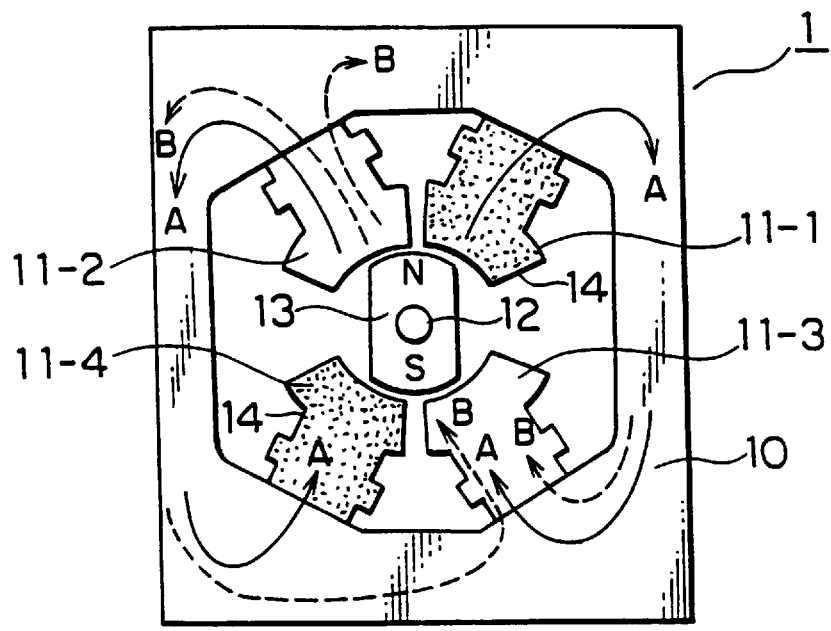
FIG. 2 shows the arrangement of one embodiment of the thermo-sensitive actuator according to the present invention.

FIG. 2 shows the arrangement of one embodiment of the thermo-sensitive actuator according to the present invention. In FIG. 2, a thermo-sensitive actuator body 1 comprises a stator (yoke) 10 made of a magnetic material, pole pieces 11-1, 11-2, 11-3 and 11-4 connected to the stator 10, and a rotor 13 secured to a shaft 12. In this embodiment, the rotor 13 is a permanent magnet having north and south poles. It should be noted that the pole pieces 11-1 and 11-4 are formed by using a thermo-sensitive magnetic material (shown by the dotted portions) 14 having negative characteristics, for example, thermo ferrite.

Figure 3:
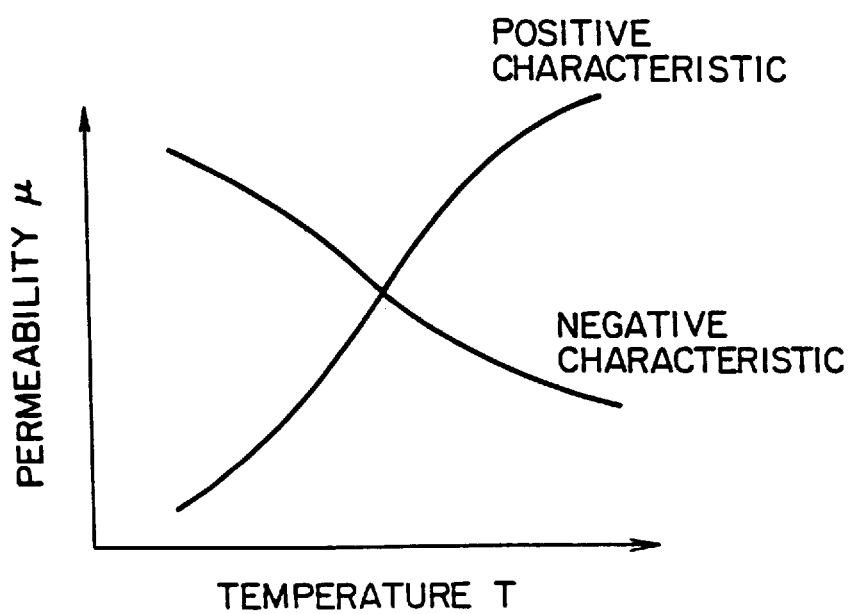
FIG. 3 is a graph showing the relationship between the permeability of thermo-sensitive magnetic materials and temperature.

FIG. 3 is a graph showing the characteristics of thermo-sensitive magnetic materials, in which permeability $\mu$ is plotted along the ordinate axis, and temperature T is plotted along the abscissa axis. As shown in the graph, there are two different types of thermo-sensitive magnetic material: one in which the permeability increases as the temperature rises (positive characteristics); and another in which the permeability decreases as the temperature rises (negative characteristics).

Next, the operation of the thermo-sensitive actuator shown in FIG. 2 will be explained.

In this embodiment, since thermo ferrite is used as a thermo-sensitive magnetic material, magnetic lines of force A from the north pole of the permanent magnet, which constitutes the rotor 13, normally flow out to the yoke 10 through the pole pieces 11-1 and 11-2 and return to the south pole, passing equally through the pole pieces 11-3 and 11-4, which are provided in association with the pole pieces 11-1 and 11-2, as shown by the solid lines. Accordingly, the rotor 13 maintains a neutral position as illustrated in the figure.

When the temperature rises in this state, since the magnetic material has negative characteristics, the permeability of the pole pieces 11-1 and 1-4 decreases. Accordingly, the magnetic lines of force passing through the pole pieces 11-1 and 11-4 weaken, while the magnetic lines force passing through the other pole pieces 11-2 and 11-3 strengthen, as shown by the dotted lines. Consequently, the rotor (permanent magnet) 13 rotates counterclockwise about the shaft 12. Therefore, if the direction of rotation of the shaft 12 at this time has been determined to be a closing direction of a valve body, the valve body can be actuated to close a flow passage as the temperature rises.

Although in the above-described embodiment the entire portions (dotted portions) of the pole pieces 11-1 and 11-4 are formed of a thermo-sensitive magnetic material having negative characteristics, such as thermo ferrite, the present invention is not necessarily limited to the described arrangement. The arrangement may be such that a thermo-sensitive magnetic material is provided in only a part of a pole piece. With the alternative arrangement also, the same advantageous effects can be obtained. The expression "a part of a pole piece" herein means that a thermo-sensitive magnetic material is provided in a part of the pole piece along the direction of the magnetic lines of force (i.e. a part of the pole piece at each of the left- and right-hand sides thereof). According to the above-described embodiment, it becomes unnecessary to provide a temperature detector as a separate member, and it is possible to simplify the structure and reduce the cost.

Figure 4:
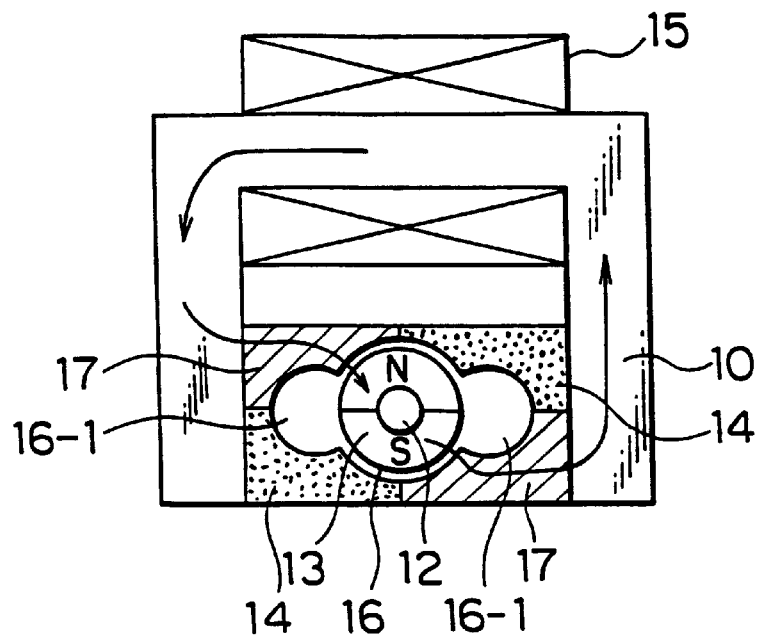
FIG. 4 shows the arrangement of another embodiment of the thermo-sensitive actuator according to the present invention.

FIG. 4 shows the arrangement of another embodiment of the present invention.

In FIG. 4, a coil 15 is used as a magnetic source. A rotor (permanent magnet) 13 is attached to a shaft 12, and rotatably provided in an opening 16 provided in a part of a yoke 10. It should be noted that a pair of relatively wide openings (eccentrically elongated grooves) 16-1 are provided at both left and right sides of the permanent magnet 13, and narrow gaps are provided at the upper and lower sides of the permanent magnet 13.

Thermo-sensitive magnetic materials 14 having negative characteristics are provided at respective positions which diagonally face each other across the opening 16, in the same way as in the first embodiment (see FIG. 2). In this embodiment, however, thermo-sensitive magnetic materials 17 having positive characteristics are provided at the other diagonally facing positions. Accordingly, as the temperature rises, the permeability of the thermo-sensitive magnetic materials 14 decreases, whereas the permeability of the thermo-sensitive magnetic materials 17 increases. These actions cause the field distortion to increase. That is, the permeability difference produced as a result of the rise of temperature becomes even more remarkable, and thus the operation becomes even more reliable.

Figure 5:
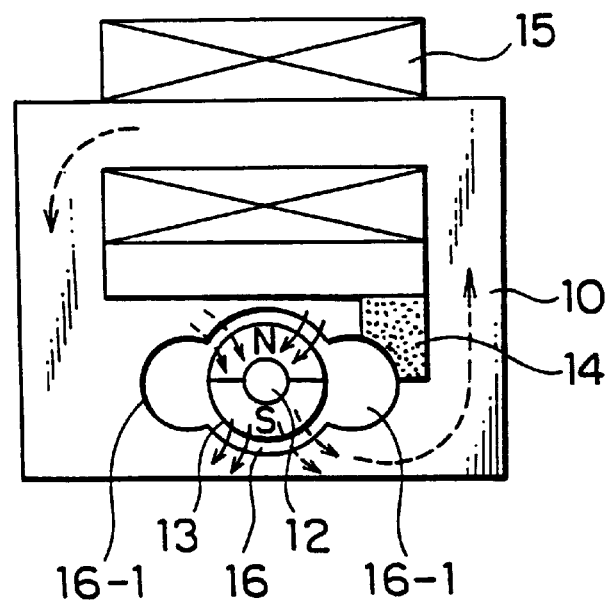
FIG. 5 shows the arrangement of still another embodiment of the thermo-sensitive actuator according to the present invention.

FIG. 5 shows the arrangement of still another embodiment of the present invention.

In FIG. 5, the same portions as those shown in FIG. 4 are denoted by the same reference numerals, and description thereof is omitted. In this embodiment, a thermo-sensitive magnetic material (negative characteristics) 14 is provided in only one of magnetic paths facing each other across the permanent magnet 13 (at a position obliquely upward of the permanent magnet 13 on the right in this case). In this embodiment, as the temperature rises, the permeability of the thermo-sensitive magnetic material 14 decreases. Consequently, the magnetic flux passing through the dotted-line portions increases. Accordingly, the permeability difference becomes remarkable, and thus the operation becomes even more reliable. That is, the magnetic flux passing through the solid-line portions decreases, while the magnetic flux passing through the dotted-line portions increases. Thus, as the temperature rises, the rotor 13 rotates counterclockwise, urging a valve-closing operation.

Figure 6:
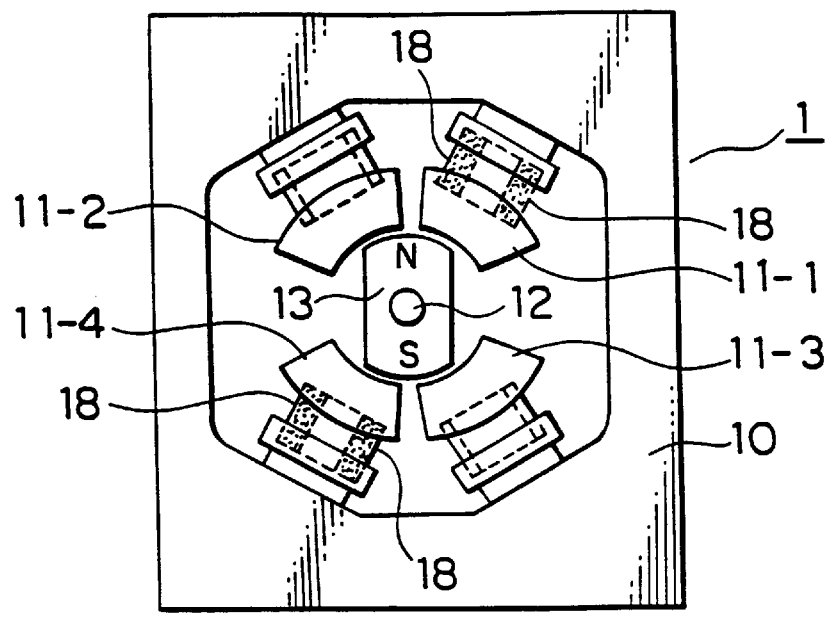
FIG. 6 shows the arrangement of a further embodiment of the thermo-sensitive actuator according to the present invention.

FIG. 6 shows the arrangement of a further embodiment of the present invention. In FIG. 6, the same portions as those shown in FIG. 2 are denoted by the same reference numerals, and description thereof is omitted. In this embodiment, a thermo-sensitive magnetic material 18 is provided in only a portion (dotted portion) at each of the left- and right-sides of each of a pair of pole pieces 11-1 and 11-4 which are provided to face each other. In a case where the thermo-sensitive magnetic materials 18 have negative characteristics, for example, as the temperature rises, the magnetic flux passing through the pole pieces 11-1 and 11-4 decreases, and the magnetic flux passing through the pole pieces 11-2 and 11-3 increases inversely. Accordingly, the rotational angle of the rotor 13 can be changed.

Figure 7:
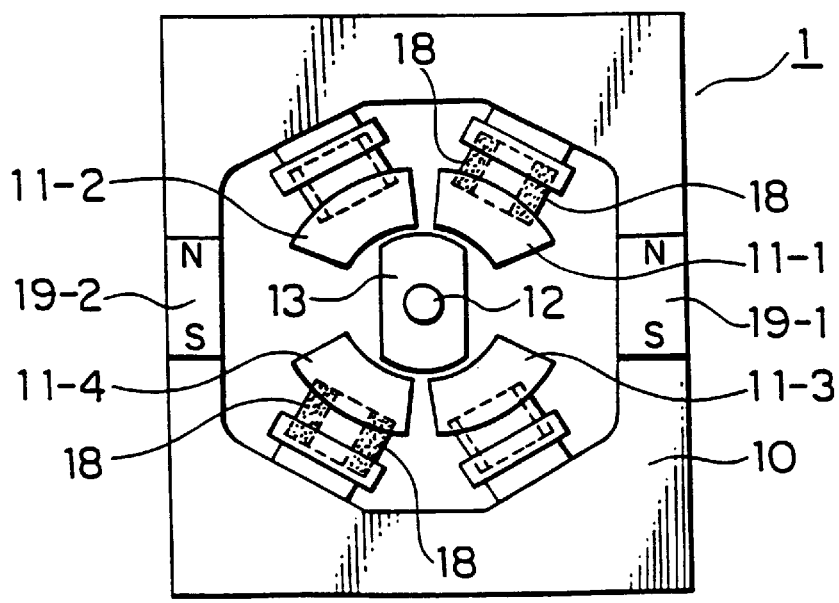
FIG. 7 shows the arrangement of a still further embodiment of the thermo-sensitive actuator according to the present invention.

FIG. 7 shows a still further embodiment of the present invention. In FIG. 7, the same portions as those shown in FIG. 6 are denoted by the same reference numerals, and description thereof is omitted. In this embodiment, two permanent magnets 19-1 and 10-2, which serve as a magnetic source, are provided in a stator 10, and a rotor 13 is not formed from a permanent magnet. The arrangement of the rest of this embodiment is the same as that shown in FIG. 6. In this embodiment also, the same advantageous effects as in the case of FIG. 6 can be obtained. In addition, the size of the magnetic source can be changed with relative ease (it is only necessary to change the strength of the permanent magnet). Accordingly, it is possible to increase the degree of freedom in application of the thermo-sensitive actuator.

Figure 8:
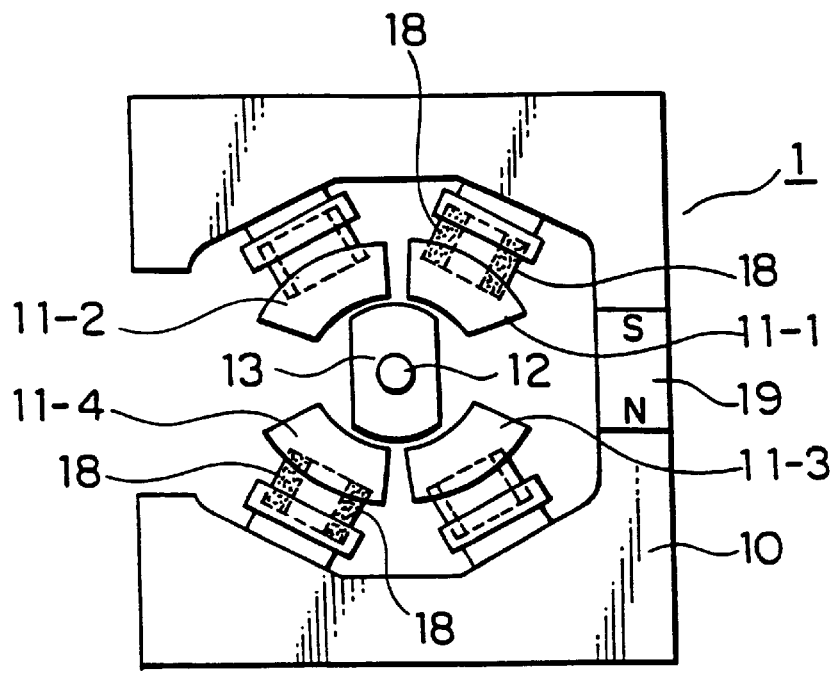
FIG. 8 shows a modification of the arrangement shown in FIG. 7.

FIG. 8 shows a modification of the arrangement shown in FIG. 7. In the modification, one side of the stator 10 is provided with a permanent magnet 19 as a magnetic source, and the other side of the stator 10 is opened to limit the path for magnetic flux. The arrangement of the rest of the modification is the same as that shown in FIG. 7. Accordingly, it will be clear that the same advantageous effects as those in the case of FIG. 7 can be obtained.

Figure 9:
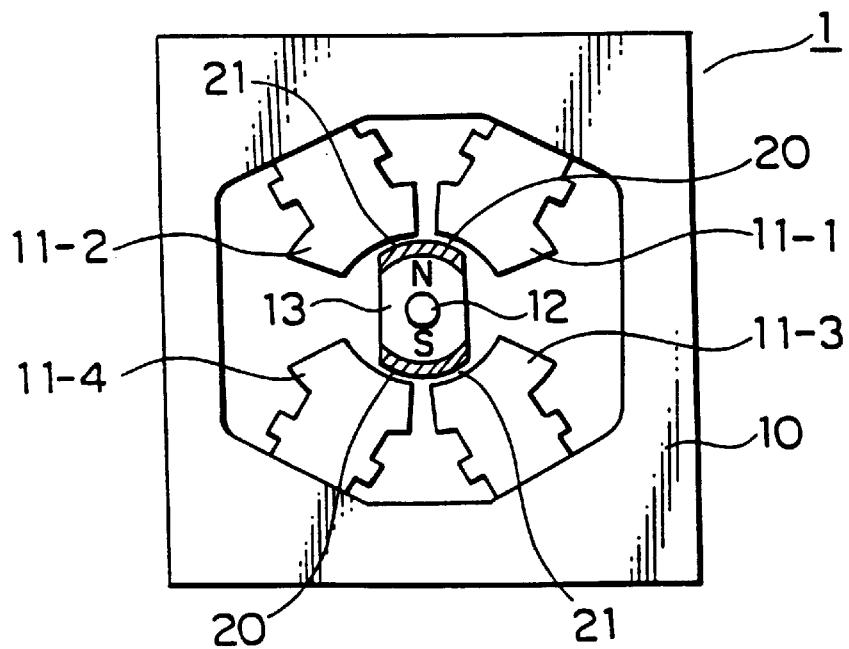
FIG. 9 shows the arrangement of a still further embodiment of the thermo-sensitive actuator according to the present invention.

FIG. 9 shows the arrangement of a still further embodiment of the present invention. In this embodiment, thermo-sensitive magnetic materials 20 and 21 are attached to each projecting end portion of a rotor 13 made of a permanent magnet, and pole pieces 11-1, 11-2, 11-3 and 11-4 are not subjected to any treatment. In the illustrated arrangement, for example, the thermo-sensitive magnetic materials 20 (the dotted portions) have negative characteristics, whereas the thermo-sensitive magnetic materials 21 (the hatched portions) have positive characteristics.

According to this embodiment, as the temperature rises, the thermo-sensitive magnetic materials 20 and 21 individually show changes in permeability, thus carrying out the same function as that described above. In addition, a specific function can be intensively imparted to the rotor 13 only (i.e. in this embodiment, only the end portions of the rotor 13 are provided with thermo-sensitive magnetic materials). Accordingly, only this portion of the device needs to be produced by a manufacturer specializing in that type of product; this is convenient for the control of parts to be assembled.

Figure 10:
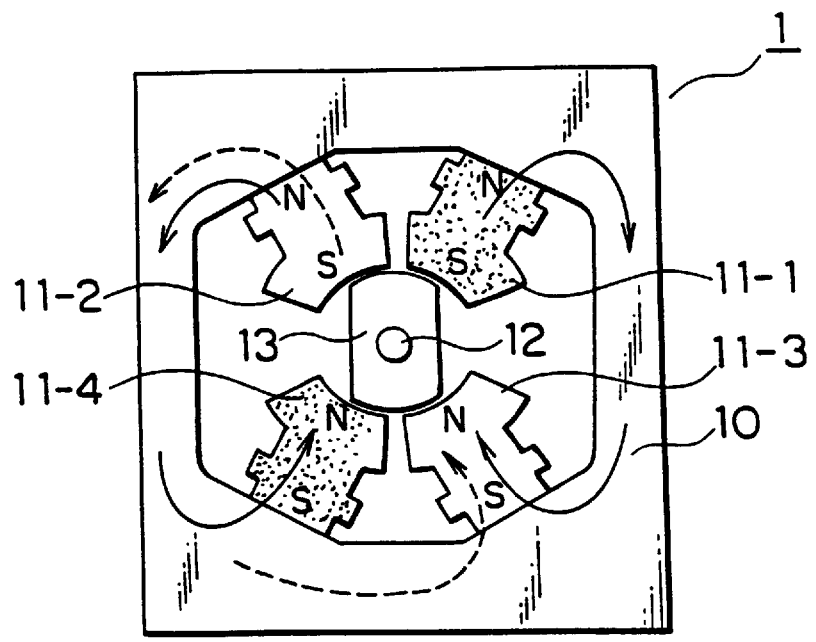
FIG. 10 shows the arrangement of a still further embodiment of the thermo-sensitive actuator according to the present invention.

FIG. 10 shows the arrangement of a still further embodiment of the present invention. In this embodiment, pole pieces 11-1, 11-2, 11-3 and 11-4 are formed from permanent magnets of thermo-sensitive magnetic materials, whereas, a rotor 13 is not formed from a permanent magnet. In the illustrated arrangement, for example, the pole pieces 11-1 and 11-4 are formed by using a ferrite magnet material whose magnetomotive force lowers as the temperature rises (i.e. negative characteristics), and the other pole pieces 11-2 and 11-3 are formed by using a samarium-cobalt magnet material having stable characteristics (weak negative characteristics). The operation of this embodiment is as follows: Normally, magnetic flux follows the solid-line path. However, as the temperature rises, the magnetomotive force of the ferrite magnets decreases, causing the rotor 13 to rotate counterclockwise. In this embodiment also, the same advantageous effects as those in the foregoing embodiments can be obtained.

Figure 11:
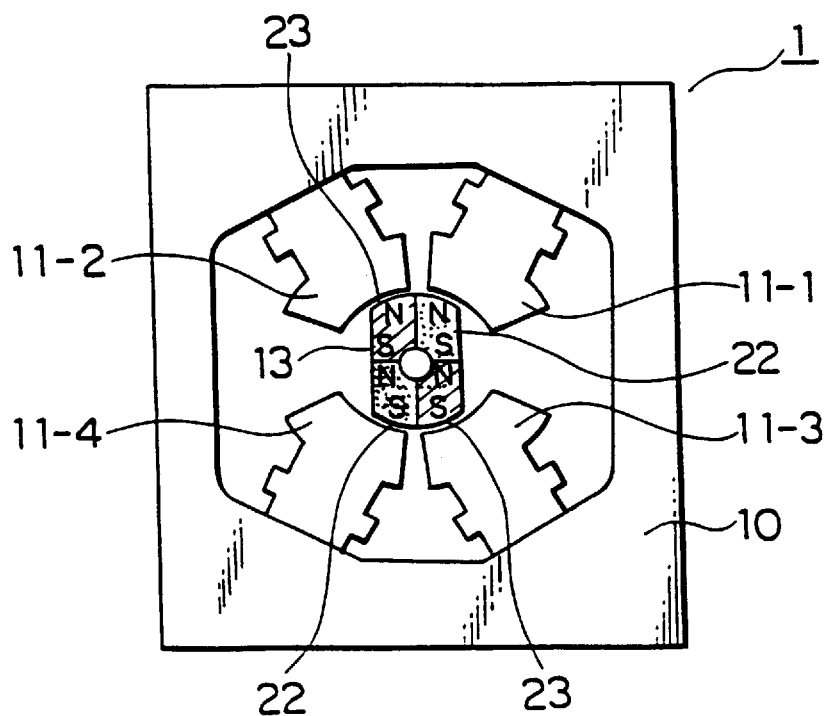
FIG. 11 shows the arrangement of a still further embodiment of the thermo-sensitive actuator according to the present invention.

FIG. 11 shows the arrangement of a still further embodiment of the present invention. In this embodiment, a rotor 13 is formed by combining together a permanent magnet of a thermo-sensitive magnetic material having negative or positive characteristics, and a permanent magnet having stable characteristics in terms of temperature. That is, the rotor 13 is formed by combining together permanent magnets composed of a dotted portion 22 and a hatched portion 23. The function of this embodiment is the same as already described above. It will be clear that in this embodiment also, the same advantageous effects as those in the foregoing embodiments can be obtained.

Figure 12:
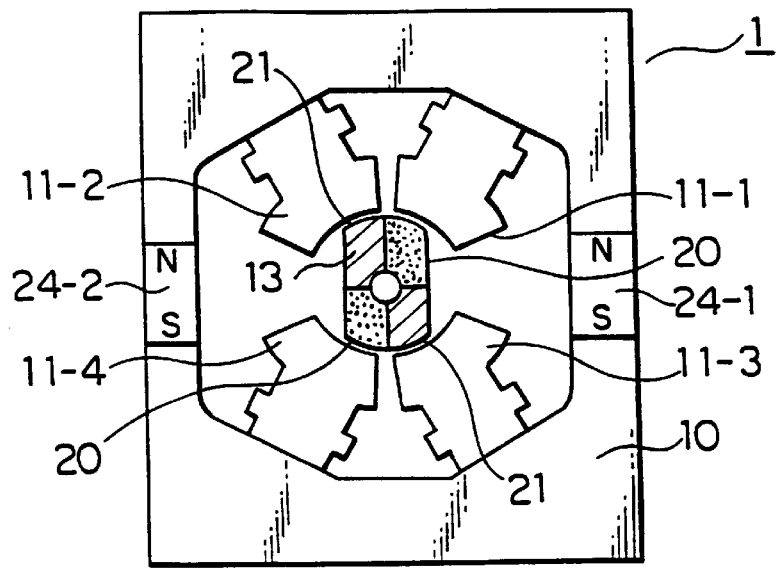
FIG. 12 shows the arrangement of a still further embodiment of the thermo-sensitive actuator according to the present invention.

FIG. 12 shows the arrangement of a still further embodiment of the present invention. In this embodiment, a stator 10 is provided with two permanent magnets 24-1 and 24-2 as a magnetic source. A rotor 13 is formed by combining together thermo-sensitive magnetic materials respectively having negative and positive characteristics. In this embodiment also, the same advantageous effects as those in the foregoing embodiments can be obtained.

Figure 13:
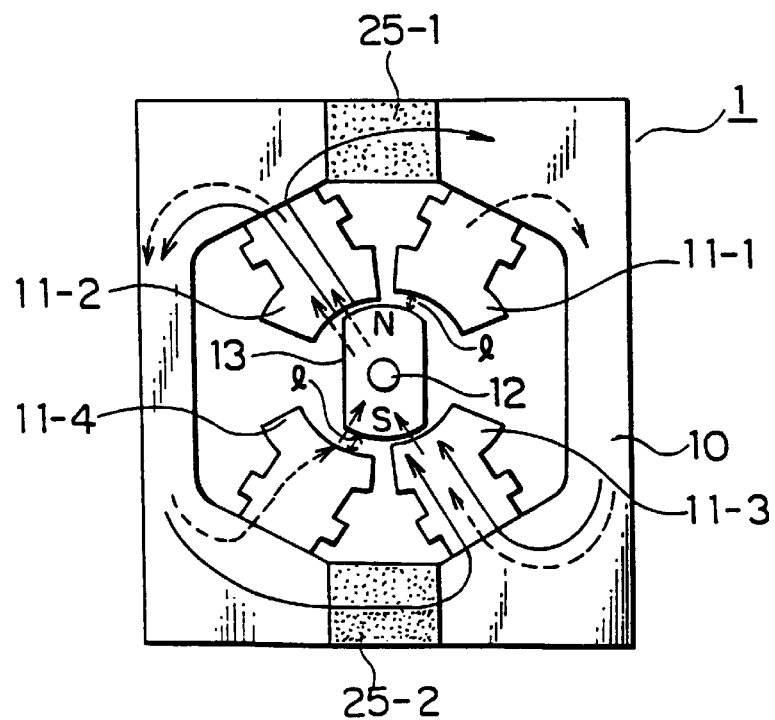
FIG. 13 shows the arrangement of a still further embodiment of the thermo-sensitive actuator according to the present invention.

FIG. 13 shows the arrangement of a still further embodiment of the present invention. In this embodiment, the air gap ι between each of a first pair of pole pieces 11-1 and 11-4 and a rotor 13 is unbalanced with the air gap (not shown) between each of a second pair of pole pieces 11-2 and 11-3 and the rotor 13. That is, in the illustrated arrangement, the air gap ι is larger than the other air gap. Further, the stator 10 is provided with thermo-sensitive magnetic materials 25-1 and 25-2 having negative characteristics at respective positions between the pole pieces 11-1 and 11-2 and between the pole pieces 11-3 and 11-4.

Normally (at low temperature), magnetic flux follows the solid-line path. However, as the temperature rises, the permeability reduces, causing the portions of the thermo-sensitive magnetic materials 25-1 and 25-2 to turn off. Consequently, magnetic paths shown by the dotted lines are formed. As a result, the rotor 13 rotates clockwise. In this embodiment also, the same advantageous effects as those in the foregoing embodiments can be obtained.

Figure 14:
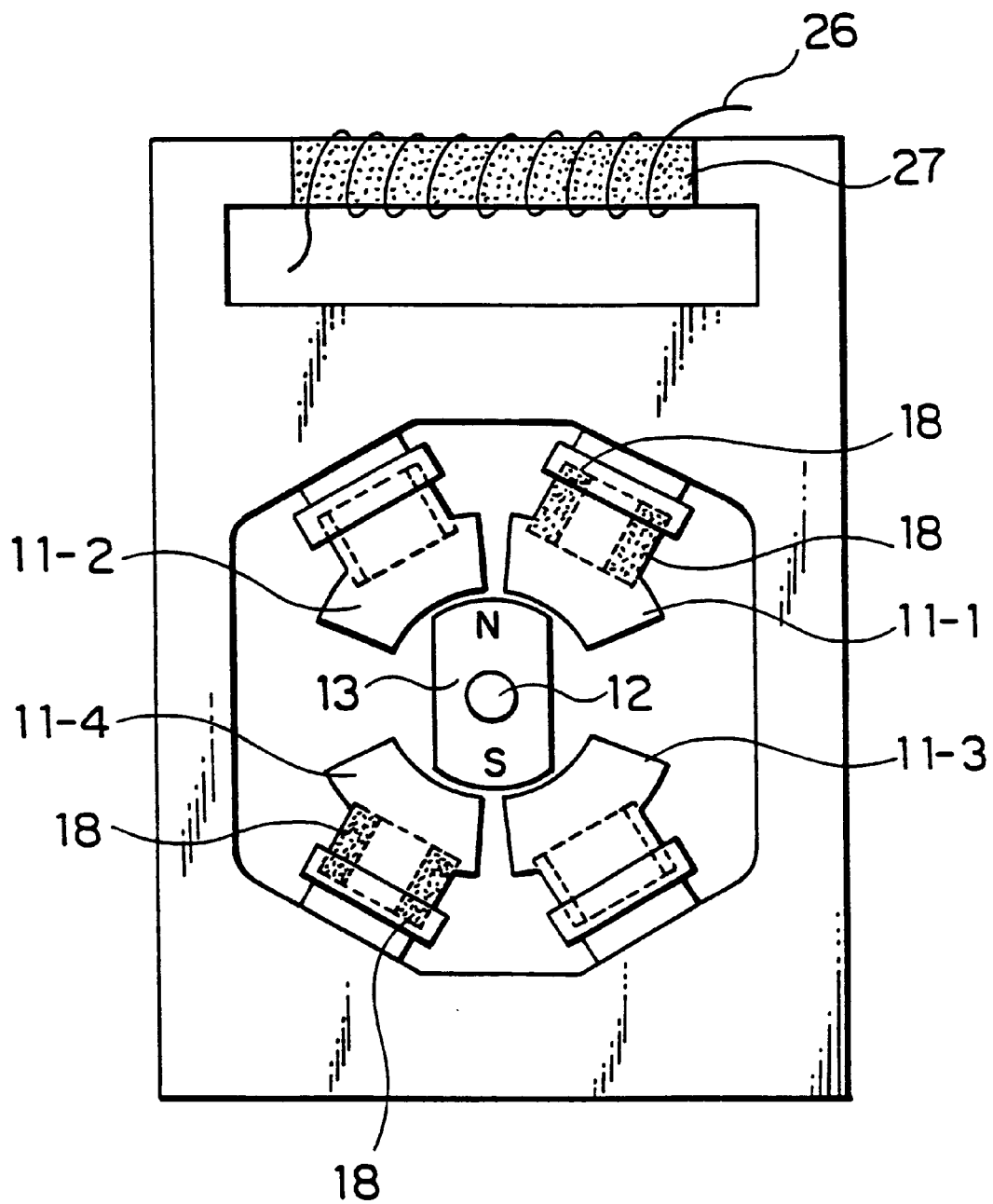
FIG. 14 shows one example of the way in which the thermo-sensitive actuator of the present invention is used.

FIG. 14 shows the arrangement of a still further embodiment of the present invention. This embodiment is based on the arrangement shown in FIG. 6. In this embodiment, a part of the core is formed of a thermo-sensitive magnetic material 27, and this part of the core is wound with an electromagnetic coil 26. Accordingly, when an electric current is left flowing through the electromagnetic coil 26, magnetic flux produced at high temperature is reduced by the action of the thermo-sensitive magnetic material 27 of negative characteristics provided inside the electromagnetic coil 26 on the basis of the principle which has already been described above. Thus, this embodiment is used as a fail-safe device. Since the operating principle has already repeatedly been explained, description thereof is herein omitted.

Figure 15A:
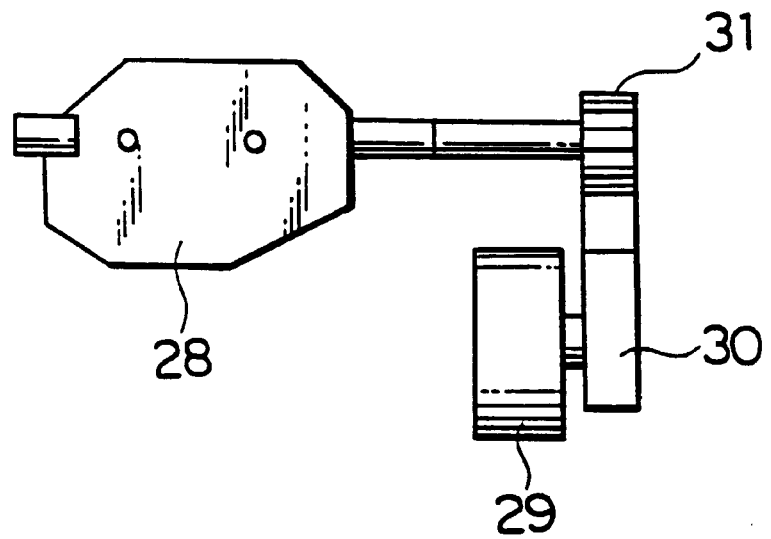
FIGS. 15a and 15b show another example of the way in which the thermo-sensitive actuator of the present invention is used.
Figure 15B:
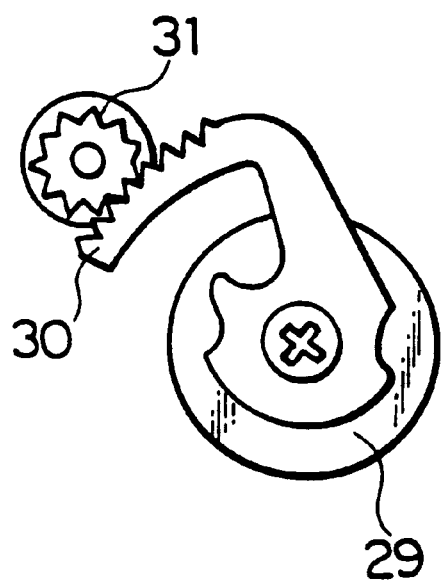

FIGS. 15a and 15b show the way in which the thermo-sensitive actuator of the present invention is actually used. In this case, the thermo-sensitive actuator is used as a drive source for a choke valve. In the sectional view of FIG. 15a, a choke valve 28 is driven by a thermo-sensitive actuator 29. More specifically, the thermo-sensitive actuator 29 drives a rack 30 so as to rotate the choke valve 28 through a pinion 31, as shown in the front view of FIG. 15b. Since the thermo-sensitive actuator 29 rotates as far as the position where the torque balances with a torque generated owing to the eccentricity of the valve 28, the pinion 31 and the valve 28 can be directly connected to each other. If the thermo-sensitive actuator 29 is arranged so that it can be electromagnetically driven, positive air-fuel ratio control can be effected.

Figures 16A, 16B:
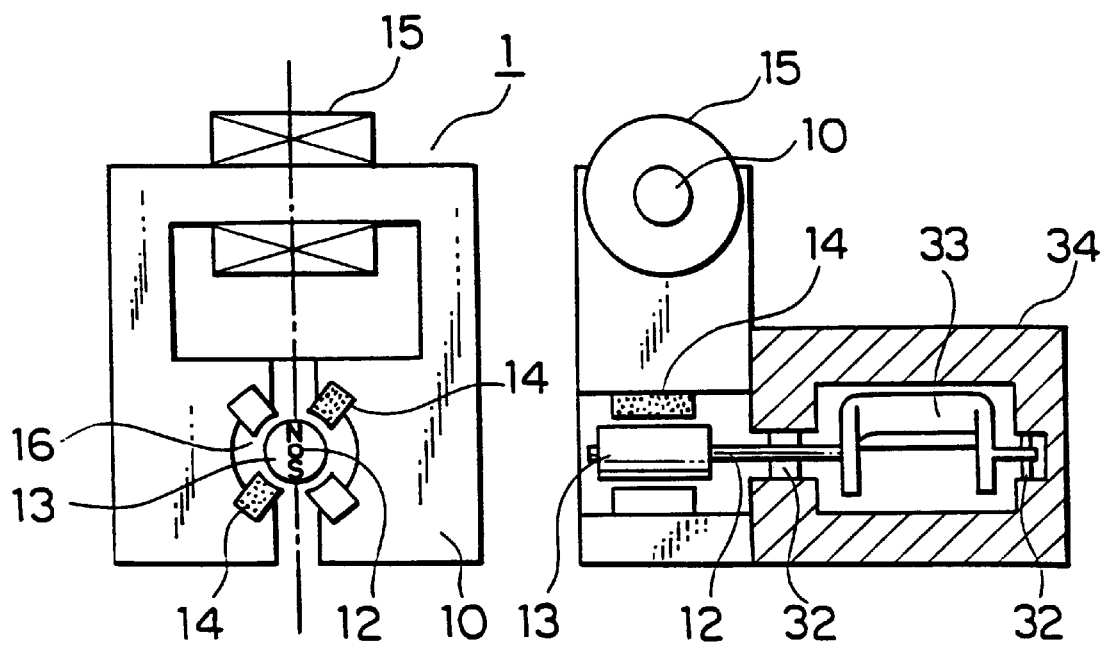
FIGS. 16a, 16b and 16c show the arrangement of one embodiment in which the thermo-sensitive actuator of the present invention is applied to an idle speed controller of an automobile.
Figure 16C:
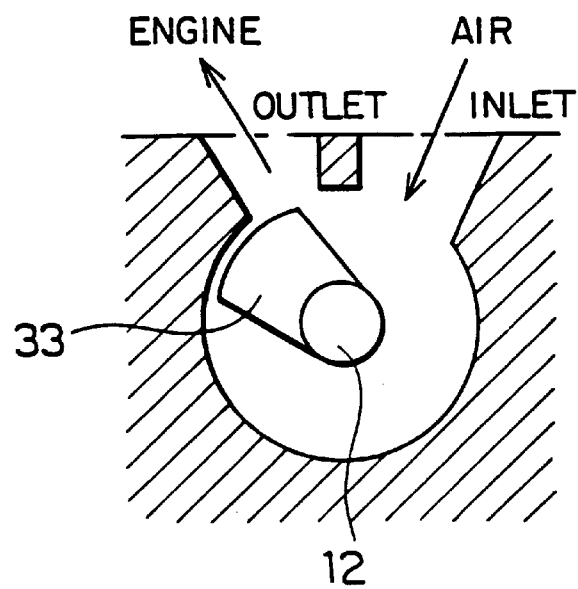

FIGS. 16a, 16b and 16c show an embodiment in which a thermo-sensitive actuator arranged as described above is applied to an idle speed controller (ISC) of an automobile. In the thermo-sensitive actuator body used in this embodiment, a yoke 10 is wound with a coil 15 to form a magnetic source, and a rotor (permanent magnet) 13 is provided in a opening 16. In addition, thermo-sensitive magnetic materials 14 are provided at respective positions which diagonally face each other across the opening 16. The arrangement of the thermo-sensitive actuator has already fully been explained.

FIG. 16a is a front view, and FIG. 16b is a schematic sectional view taken along the center line (chain line) in FIG. 16a. A shaft 12 is supported through bearings 32 serving as supporting points, and a control valve 33 is secured to the shaft 12 so as to rotate together with the shaft 12. FIG. 16c is a sectional view schematically showing the inside of the body 34. Air taken in flows through a bypass passage, which is separate from the main air passage. The control valve 33 controls the quantity of air flowing through the bypass passage. Since the idle speed controller arrangement per se is known, description thereof is omitted.

According to this embodiment, the control valve is rotated by using a thermo-sensitive actuator which has a thermo-sensitive magnetic material inserted in a part of the magnetic path. Therefore, it is possible to realize idle speed control according to temperature without the need of separately providing a temperature detector.

Figure 17:
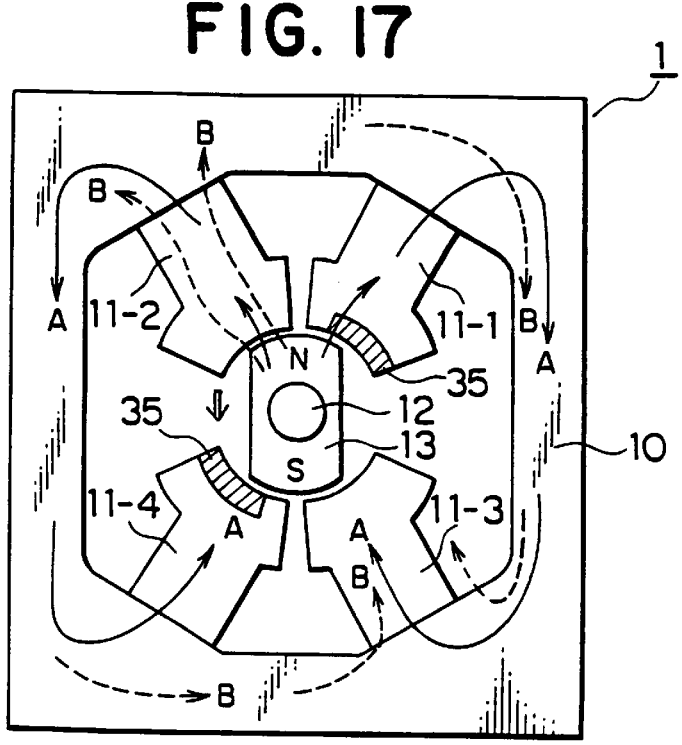
FIG. 17 shows the arrangement of a still further embodiment of the thermo-sensitive actuator according to the present invention.

FIG. 17 shows the arrangement of a still further embodiment of the thermo-sensitive actuator according to the present invention. In this embodiment, a thermo-sensitive magnetic material 35 having negative characteristics is provided in a part of the end surface of each of a pair of opposing pole pieces 11-1 and 11-4.

Next, the operation will be explained.

In this embodiment, since a thermo-sensitive magnetic material having negative characteristics is used, when the temperature is low, the permeability is relatively high. Accordingly, a pair of pole pieces 11-1 and 11-4 and another pair of pole pieces 11-2 and 11-3 pass magnetic flux equally with each other. Therefore, magnetic flux coming out of the permanent magnet constituting the rotor 13 forms two symmetric loops: one loop in which magnetic flux from the permanent magnet passes through the pole piece 11-2 and the stator 10 and returns to the permanent magnet through the pole piece 11-4; and another loop in which magnetic flux from the permanent magnet passes through the pole piece 11-1 and the stator 10 and returns to the permanent magnet through the pole piece 11-3. Accordingly, the rotor 13 lies in the center.

When the temperature rises, the permeability of the thermo-sensitive magnetic material decreases. Consequently, the magnetic flux passing through the pole pieces 11-1 and 11-4 decreases, whereas the magnetic flux passing through the pole pieces 11-2 and 11-3 increases. Accordingly, the rotor (permanent magnet) 13 is attracted to the pole pieces 11-2 and 11-3, and thus a torque is induced in the rotor 13, causing the rotor 13 to rotate in the direction of the solid-line arrow. It should be noted that, when the temperature reaches the Curie point of the thermo-sensitive magnetic material, the thermo-sensitive magnetic material becomes paramagnetic; therefore, the rotor 13 will not rotate any longer even if the temperature rises above the Curie point. Since the amount of rotation at that time is determined by the area which the thermo-sensitive magnetic material occupies in each piece, it can be readily set.

Figure 18:
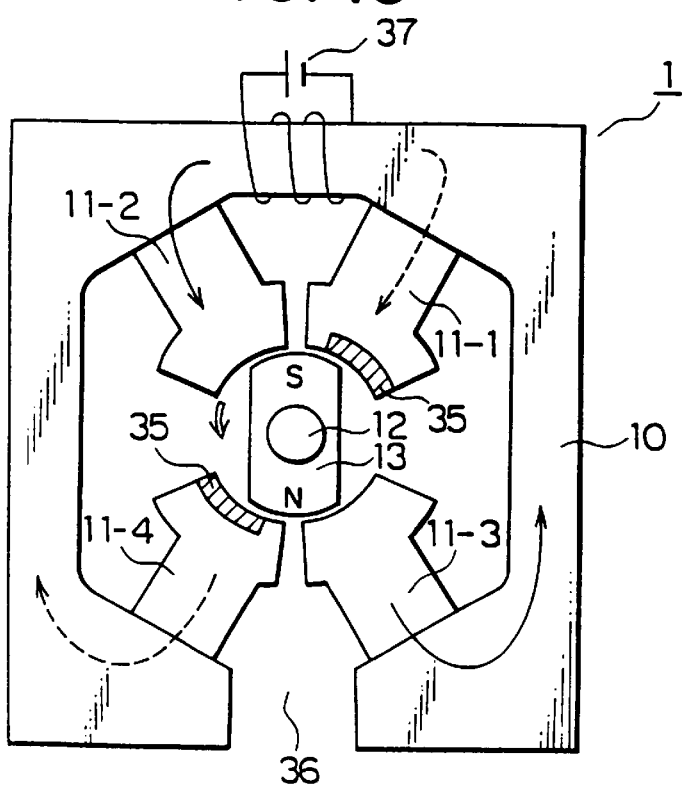
FIG. 18 shows the arrangement of a still further embodiment of the thermo-sensitive actuator according to the present invention.

FIG. 18 shows the arrangement of a still further embodiment of the thermo-sensitive actuator according to the present invention. In FIG. 18, portions which are identical or equivalent to those in FIG. 17 are denoted by the same reference numerals, and description thereof is omitted. In this embodiment, the stator 10 is cut at a portion thereof which lies between the pole pieces 11-3 and 11-4 to provide an air gap 36. In addition, the stator 10 is provided with a magnetic source 37. The arrangement of the rest of this embodiment is the same as that shown in FIG. 17.

Next, the operation will be explained.

In this case, magnetic flux produced by the coil of the magnetic source 37 generates a loop that passes through the pole pieces 11-2 and 11-3 (acting on the rotor 13 in the valve-closing direction), and another loop that passes through the pole pieces 11-1 and 11-4 (acting on the rotor 13 in the valve-opening direction).

According, when the saturated magnetic flux density in the thermo-sensitive magnetic material lowers at high temperature, the magnetic flux passing through the pole pieces 11-1 and 11-4 decreases, resulting in reduction of the action of the coil in the valve-opening direction. Thus, the specifications required for the ISC are satisfied. It should be noted that, since the amount of rotation of the rotor 13 corresponding to the temperature change can be determined by varying the installation area (occupied area) of the thermo-sensitive magnetic material, the design for obtaining the required characteristics is facilitated.

Figure 19:
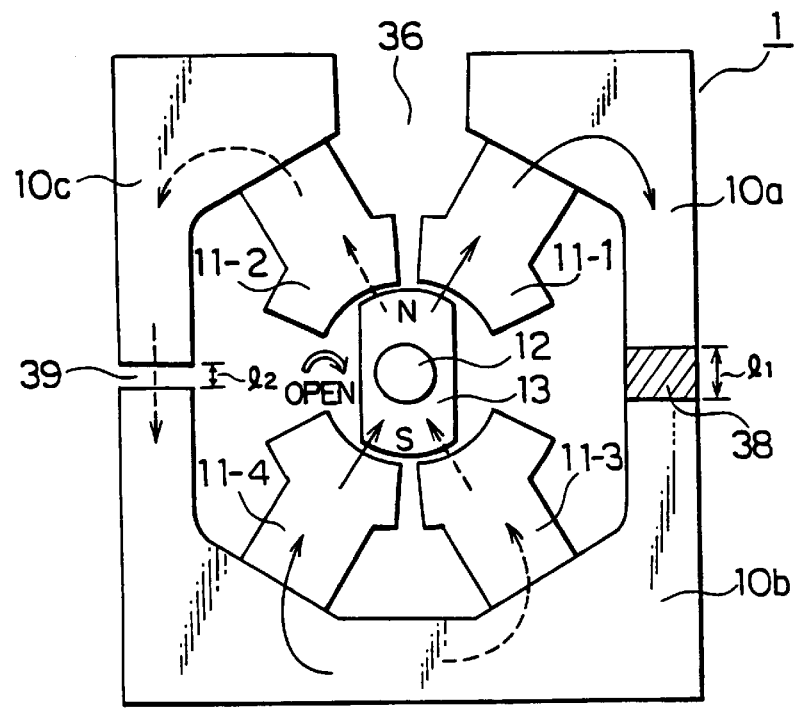
FIG. 19 shows the arrangement of a still further embodiment of the thermo-sensitive actuator according to the present invention.

FIG. 19 shows the arrangement of a still further embodiment of the thermo-sensitive actuator according to the present invention. In FIG. 19, portions which are identical or equivalent to those in FIGS. 17 and 18 are denoted by the same reference numerals, and description thereof is omitted. In this embodiment, a stator 10 comprises three stator members 10a, 10b and 10c. A thermo-sensitive magnetic material 38 is provided between the stator members 10a and 10b, and an air gap 39 is provided between the stator members 10b and 10c. In this case, the relationship between the width $\iota_1$ of the thermo-sensitive magnetic material 38 and the air gap $\iota_2$ is set so as to satisfy the condition of $\iota_1 > \iota_2$, thereby making it possible to change the characteristics.

Next, the operation will be explained.

When the temperature is low, the thermo-sensitive magnetic material 38 passes magnetic flux equally with the stator 10. Therefore, regarding magnetic flux from the permanent magnet 13 constituting the rotor, a magnetic flux loop that passes through the pole piece 11-1, the stator member 10a, the thermo-sensitive magnetic material 38, the stator member 10b and the pole piece 11-4 is stronger than a magnetic flux loop that extends from the pole piece 11-2 to the pole piece 11-3 because the latter loop passes through the air gap 39. Consequently, the rotor 13 rotates in the valve-opening direction from the center line (the line lying between the pole pieces 11-1 and 11-2).

As the temperature rises, the saturated magnetic flux density in the thermo-sensitive magnetic material lowers, and when the temperature reaches the Curie point of the thermo-sensitive magnetic material, the thermo-sensitive magnetic material becomes paramagnetic. Consequently, the thermo-sensitive magnetic material portion 38 becomes equivalent to air in terms of permeability. If the condition of $\iota_1 > \iota_2$ is set, the magnetic reluctance of the air gap 39 becomes smaller than that of the thermo-sensitive magnetic material portion 38. Accordingly, the magnetic flux passing through the pole pieces 11-1 and 11-4 decreases, whereas the magnetic flux passing through the pole pieces 11-2 and 11-3 increases. As a result, the rotor 13 is attracted to the pole pieces 11-2 and 11-3, and thus a torque is induced in the rotor 13, causing the rotor 13 to rotate in the valve-closing direction from the center line.

Figure 20:
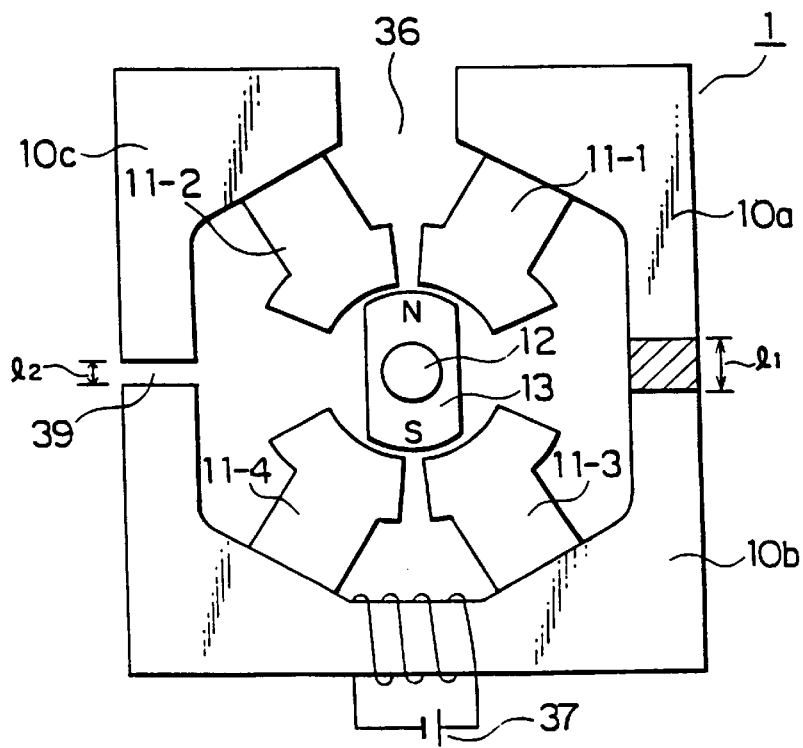
FIG. 20 shows the arrangement of a still further embodiment of the thermo-sensitive actuator according to the present invention.

FIG. 20 shows the arrangement of a still further embodiment of the thermo-sensitive actuator according to the present invention. In FIG. 20, portions which are identical or equivalent to those in FIG. 19 are denoted by the same reference numerals, and description thereof is omitted. In this embodiment, a magnetic source 37 is provided. The arrangement of the rest of this embodiment is the same as that shown in FIG. 19.

First, magnetic flux produced by the coil of the magnetic source 37 generates a loop that passes through the pole pieces 11-2 and 11-3 (acting on the rotor 13 in the valve-closing direction), and another loop that passes through the pole pieces 11-1 and 11-4 (acting on the rotor 13 in the valve-opening direction). When the saturated magnetic flux density in the thermo-sensitive magnetic material lowers at high temperature, the magnetic flux passing through the pole pieces 11-1 and 11-4 decreases. In this case, the action of the coil in the valve-opening direction reduces, and thus the specifications required for the ISC are satisfied.

Figure 21:
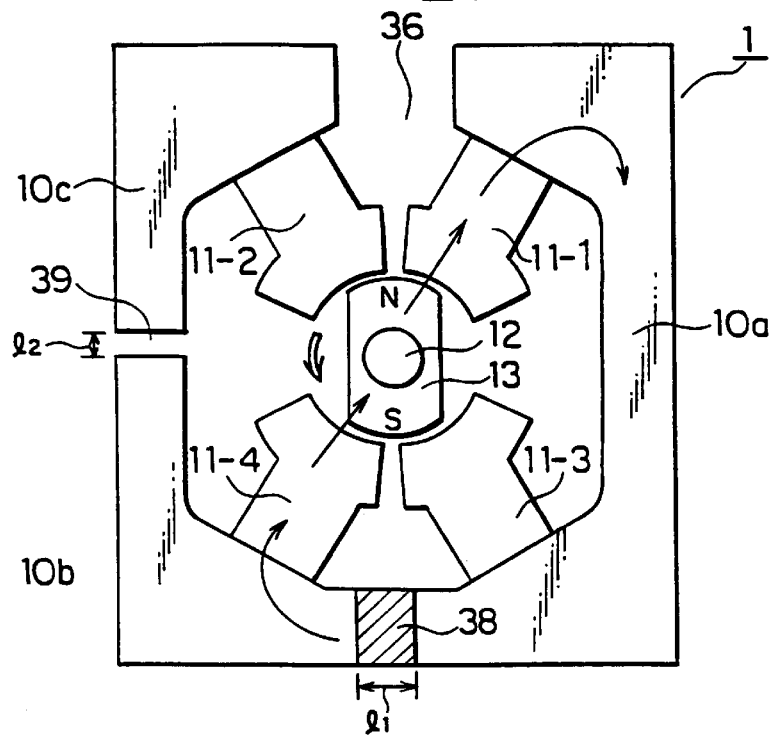
FIG. 21 shows the arrangement of a still further embodiment of the thermo-sensitive actuator according to the present invention.

FIG. 21 shows the arrangement of a still further embodiment of the thermo-sensitive actuator according to the present invention. In FIG. 21, portions which are identical or equivalent to those in FIG. 19 are denoted by the same reference numerals, and description thereof is omitted. This embodiment differs from the embodiment shown in FIG. 19 in that the thermo-sensitive magnetic material 38 is installed at a position between the pole pieces 11-4 and 11-3 (in FIG. 19, the thermo-sensitive magnetic material 38 is installed at a position between the pole pieces 11-1 and 11-3).

The operation will be explained below. When the temperature is low, the thermo-sensitive magnetic material 38 passes magnetic flux equally with the stator 10. Therefore, regarding magnetic flux from the rotor 13, a magnetic flux loop that passes through the pole piece 11-1, the stator member 10a, the thermo-sensitive magnetic material 38, the stator member 10b and the pole portion 11-4 is stronger than a magnetic flux loop that passes through the pole piece 11-2 and the stator member 10c, because the latter loop passes through the air gap 39. Consequently, the rotor 13 rotates in the valve-opening direction from the center line.

On the other hand, when the temperature is rises, the saturated magnetic flux density in the thermo-sensitive magnetic material 38 lowers. When the temperature reaches the Curie point of the thermo-sensitive magnetic material, the thermo-sensitive magnetic material becomes paramagnetic. In other words, the thermo-sensitive magnetic material portion 38 becomes equivalent to air in terms of permeability. Thus, the thermo-sensitive magnetic material portion 38 forms a large magnetic reluctance. In this case, the relationship between the width $\iota_2$ of the air gap 39 and the width $\iota_1$ of the thermo-sensitive magnetic material 38 is given by $\iota_1 > \iota_2$. Accordingly, the magnetic flux passing through the pole pieces 11-1 and 11-4 decreases, and the balanced position moves toward the center line. However, since there is the air gap 39, the magnetic flux loop passing through the pole pieces 11-1 and 11-4 is stronger than the magnetic flux loop passing through the pole pieces 11-2 and 11-3. Therefore, the balanced position will not move beyond the center line in the valve-closing direction.

Figure 22:
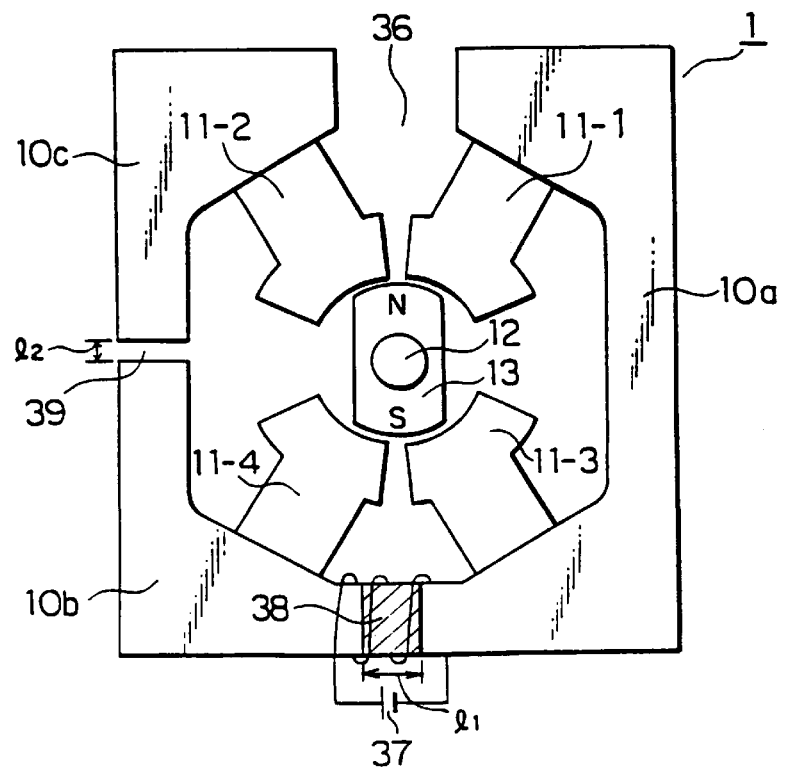
FIG. 22 shows the arrangement of a still further embodiment of the thermo-sensitive actuator according to the present invention.

FIG. 22 shows the arrangement of a still further embodiment of the thermo-sensitive actuator according to the present invention. In FIG. 22, portions which are identical or equivalent to those in FIG. 21 are denoted by the same reference numerals, and description thereof is omitted. In this embodiment, a magnetic source 37 is provided. The arrangement of the rest of this embodiment is the same as that shown in FIG. 21.

First, magnetic flux produced by the coil of the magnetic source 37 generates a loop that passes through the pole pieces 11-2 and 11-3 (acting on the rotor 13 in the valve-closing direction), and another loop that passes through the pole pieces 11-1 and 11-4 (acting on the rotor 13 in the valve-opening direction). However, when the temperature rises, the saturated magnetic flux density in the thermo-sensitive magnetic material 38 lowers, resulting in reduction of the magnetic flux produced by the coil. Consequently, the stroke of the rotor 13 induced by turning on/off the coil reduces, thus enabling the ISC to exhibit the required characteristics satisfactorily.

Figure 23:
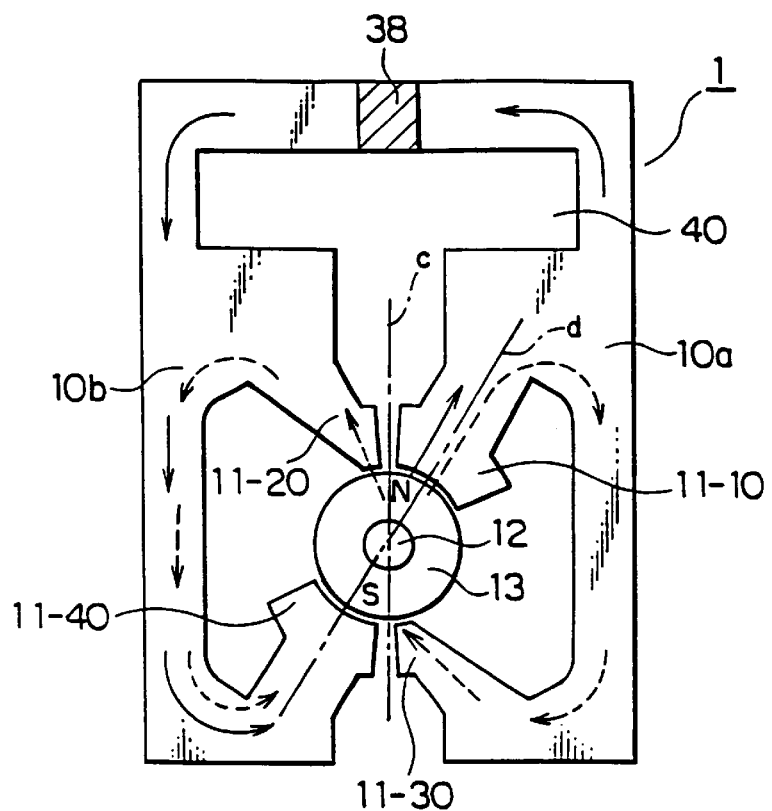
FIG. 23 shows the arrangement of a still further embodiment of the thermo-sensitive actuator according to the present invention.

FIG. 23 shows the arrangement of a still further embodiment of the thermo-sensitive actuator according to the present invention. In FIG. 23, a thermo-sensitive actuator body 1 has a pair of stator members 10a and 10b which are united to each other with a thermo-sensitive magnetic material 38 held therebetween. Further, the thermo-sensitive actuator body 1 is provided with a T-shaped space 40 in order to define the thermo-sensitive magnetic material portion 38 as a part of a magnetic path.

A pair of pole pieces 11-10 and 11-40 have relatively wide opposing end surfaces. Another pair of pole pieces 11-20 and 11-30 have relatively narrow opposing end surfaces. A rotor 13 has a circular cross-sectional configuration, and rotates about a shaft 12 as a supporting point. As will be understood from the figure, the position of the rotor 13 is determined by the ratio of the area of the surfaces of the pole pieces 11-10 and 11-40 which face the rotor 13 to the area of the surfaces of the pole pieces 11-20 and 11-30 which face the rotor 13.

In FIG. 23, the solid lines show magnetic paths formed when the temperature is low, and the dotted lines show magnetic paths formed when the temperature is high.

Next, the operation will be explained. When the temperature is low, the thermo-sensitive magnetic material 38 passes magnetic flux equally with the stator 10. Accordingly, regarding the magnetic flux from the rotor 13, the magnetic flux loop that passes through the pole piece 11-10, the stator member 10a, the thermo-sensitive magnetic material 38, the stator member 10b and the pole piece 11-40 is stronger than the other loop. Accordingly, the magnetic flux passing through the pole pieces 11-10 and 11-40 balances with the magnetic flux passing through the pole pieces 11-20 and 11-30 at a position where the center line of the rotor 13 coincides with the mutual center line d of the pole pieces 11-10 and 11-40.

When the temperature rises, the saturated magnetic flux density in the thermo-sensitive magnetic material lowers. When the temperature reaches the Curie point of the thermo-sensitive magnetic material, the thermo-sensitive magnetic material becomes paramagnetic. Consequently, the thermo-sensitive magnetic material portion 38 becomes equivalent to air in terms of permeability and hence reluctant to pass magnetic flux. At this time, the magnetic flux passing through the pole pieces 11-10 and 11-30 and the magnetic flux passing through the pole pieces 11-20 and 11-40 form symmetric loops and balance with each other (see the dotted lines in FIG. 23). Accordingly, the center line of the rotor 13 lies in the position c (i.e. the rotor 13 slightly rotates leftward).

Figure 24:
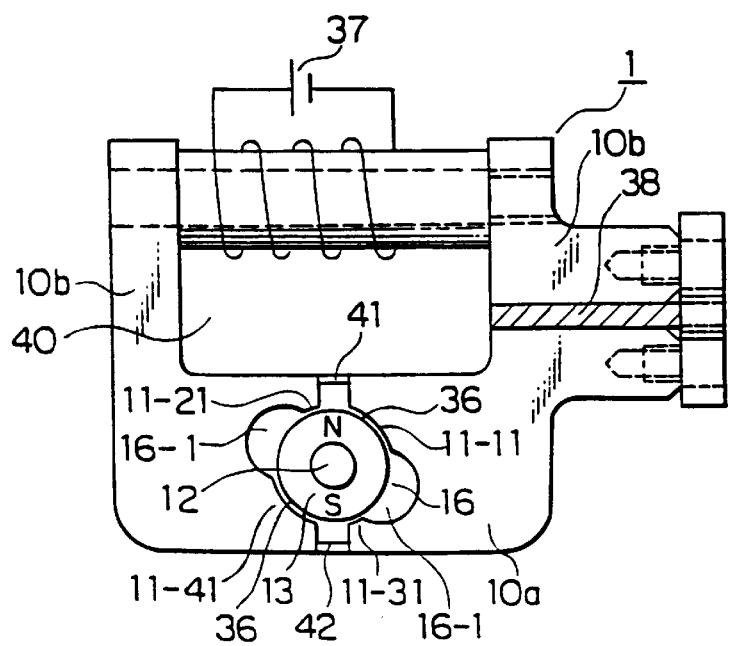
FIG. 24 shows the arrangement of a still further embodiment of the thermo-sensitive actuator according to the present invention.

FIG. 24 shows the arrangement of a still further embodiment of the thermo-sensitive actuator according to the present invention. Referring to FIG. 24, the thermo-sensitive actuator is provided with a magnetic source 37, and a thermo-sensitive magnetic material 38 is provided between a pair of stator members 10a and 10b. Reference numeral 40 denotes a space. The stator members 10a and 10b are connected together below the space 40 through connecting members 41 and 42. An opening 16 is provided between the stator members 10a and 10b. A rotor 13 which is attached to a shaft 12 is rotatably provided in the opening 16.

A pair of relatively wide openings 16-1 are provided at both sides (left- and right-hand sides) of the rotor 13 so as to diagonally face each other across the rotor 13. Further, a pair of relatively narrow gaps 36 are provided at both sides of the rotor 13 so as to diagonally face each other across the rotor 13 at an angle to the mutual center line of the openings 16-1. Consequently, pole pieces 11—11 and 11-41 having a relatively wide area are defined at the gaps 36, and pole pieces 11-21 and 11-31 having a relatively narrow area are defined at the openings 16-1, as shown in the figure.

Accordingly, magnetic flux produced by the coil of the magnetic source 37 generates a magnetic flux loop that passes through the pole pieces 11-21 and 11-31 (acting on the rotor 13 in the valve-closing direction), and a magnetic flux loop that passes through the pole pieces 11—11 and 11-41 (acting on the rotor 13 in the valve-opening direction). When the saturated magnetic flux density in the thermo-sensitive magnetic material 38 lowers at high temperature, both the magnetic flux passing through the pole pieces 11-21 and 11-31 and the magnetic flux passing through the pole pieces 11—11 and 11-41 decrease. Consequently, the stroke of the rotor 13 induced when the coil is excited reduces. Thus, the specifications required for the ISC are satisfied. The members 41 and 42 connecting the stator members 10a and 10b are necessary for fabrication and assembly purposes. It should be noted that the connecting members 41 and 42 have no effect on the magnetic circuit because the cross-sectional areas of the connecting members 41 and 42 are set at a sufficiently small value.

Figure 25:
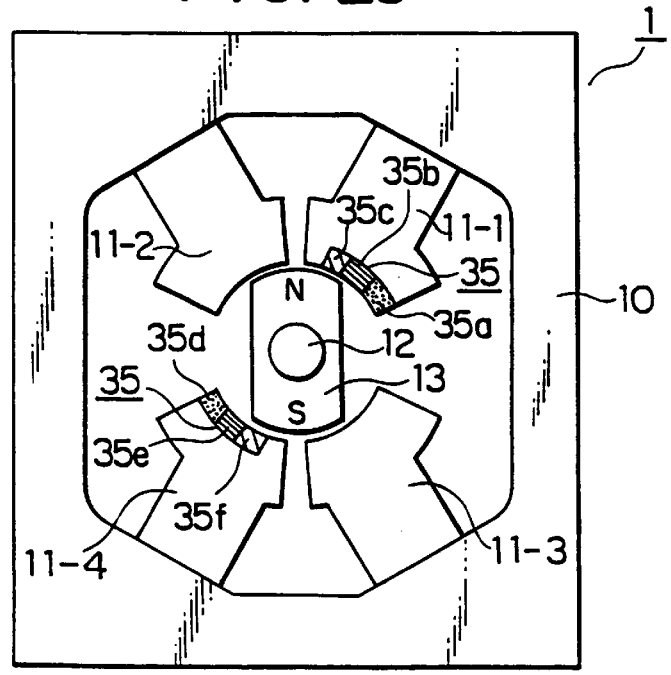
FIG. 25 shows the arrangement of a still further embodiment of the thermo-sensitive actuator according to the present invention.

FIG. 25 shows the arrangement of a still further embodiment of the thermo-sensitive actuator according to the present invention. In FIG. 25, portions which are identical or equivalent to those shown in FIG. 17 are denoted by the same reference numerals, and description thereof is omitted. The feature of the arrangement shown in FIG. 25 resides in that each thermo-sensitive magnetic material 35 comprises a combination of thermo-sensitive magnetic materials having different Curie points. That is, in this embodiment, thermo-sensitive magnetic materials 35a, 35b and 35c (35d, 35e and 35f) having respective Curie points which increase in the mentioned order are combined together. It should be noted that the thermo-sensitive magnetic material 35 is provided in a part of the end surface of each of a pair of opposing pole pieces 11-1 and 11-4.

In operation, when the temperature is low, the thermo-sensitive magnetic materials 35a, 35b, 35c, 35d, 35e and 35f pass magnetic flux equally with the pole pieces 11-2 and 11-3. Therefore, magnetic flux coming out of the rotor 13 forms two symmetric loops: one loop in which the magnetic flux from the permanent magnet passes through the pole piece 11-2 and the stator 10 and returns to the permanent magnet through the pole piece 11-3; and another loop in which the magnetic flux from the permanent magnet passes through the pole piece 11-1 and the stator 10 and returns to the permanent magnet through the pole piece 11-4. Accordingly, the rotor 13 lies in the center.

When the temperature rises, the saturated magnetic flux density in the thermo-sensitive magnetic material lowers. When the temperature reaches the Curie point of the thermo-sensitive magnetic material, the thermo-sensitive magnetic material becomes paramagnetic, and hence it becomes equivalent to air in terms of permeability. Accordingly, characteristics in which the magnetic flux passing through the pole pieces 11-1 and 11-4 reduces in accordance with a temperature rise can be set as desired by properly combining together thermo-sensitive magnetic materials having different Curie points. When the magnetic flux passing through the pole pieces 11-1 and 11-4 reduces, the rotor 13 is attracted to the pole pieces 11-2 and 11-3, and a torque thus induced in the rotor 13 causes the rotor 13 to rotate. The rotational characteristics of the rotor 13 can be precisely set.

Figure 26:
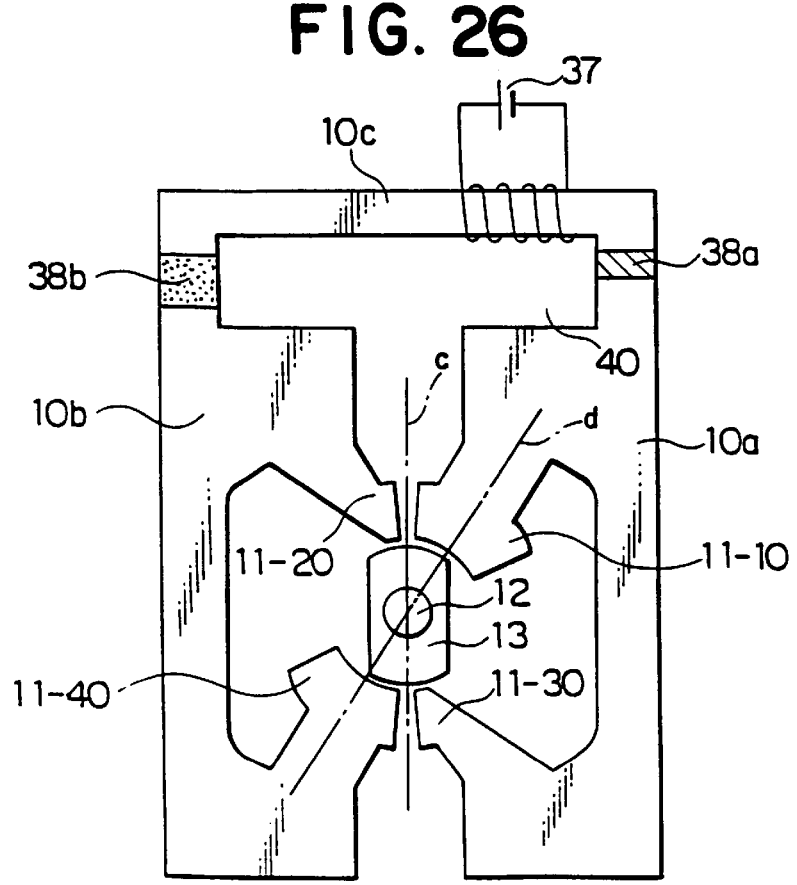
FIG. 26 shows the arrangement of a still further embodiment of the thermo-sensitive actuator according to the present invention.

FIG. 26 shows the arrangement of a still further embodiment of the thermo-sensitive actuator according to the present invention. In FIG. 26, portions which are identical or equivalent to those shown in FIG. 23 are denoted by the same reference numerals, and description thereof is omitted. In this embodiment, a thermo-sensitive magnetic material 38a is disposed between stator members 10a and 10c constituting a stator 10, and another thermo-sensitive magnetic material 38b is disposed between stator members 10b and 10c constituting the stator 10. The position of the rotor 13 is determined by the ratio of the area of the surfaces of the pole pieces 11-10 and 11-40 which face the rotor 13 to the area of the surfaces of the pole pieces 11-20 and 11-30 which face the rotor 13.

In operation, when the temperature is low, the thermo-sensitive magnetic materials 38a and 38b pass magnetic flux equally with the stator 10. Therefore, regarding magnetic flux from the rotor 13, the magnetic flux loop that passes through the pole piece 11-10, the stator member 10a, the thermo-sensitive magnetic material 38a, the stator member 10c, the thermo-sensitive magnetic material 38b, the stator member 10b and the pole piece 11-40 is stronger than the other loop. Accordingly, the magnetic flux passing through the pole pieces 11-10 and 11-40 balances with the magnetic flux passing through the pole pieces 11-20 and 11-30 at a position where the center line of the rotor 13 coincides with the mutual center line d of the pole pieces 11-10 and 11-40.

When the temperature rises, the saturated magnetic flux density in the thermo-sensitive magnetic material lowers. When the temperature reaches the Curie point of the thermo-sensitive magnetic material, the thermo-sensitive magnetic material becomes paramagnetic. Consequently, the thermo-sensitive magnetic material portions 38a and 38b become equivalent to air in terms of permeability and hence reluctant to pass magnetic flux. Therefore, the magnetic flux passing through the pole pieces 11-10 and 11-30 and the magnetic flux passing through the pole pieces 11-20 and 11-40 form symmetric loops and balance with each other. Accordingly, the center line of the rotor 13 lies in the position c. The rotational characteristics of the rotor 13 can be precisely obtained by properly selecting the Curie temperature, thickness and cross-sectional area of each thermo-sensitive magnetic material. The rotor 13 can be controlled by the magnetic source 37.

Figure 27:
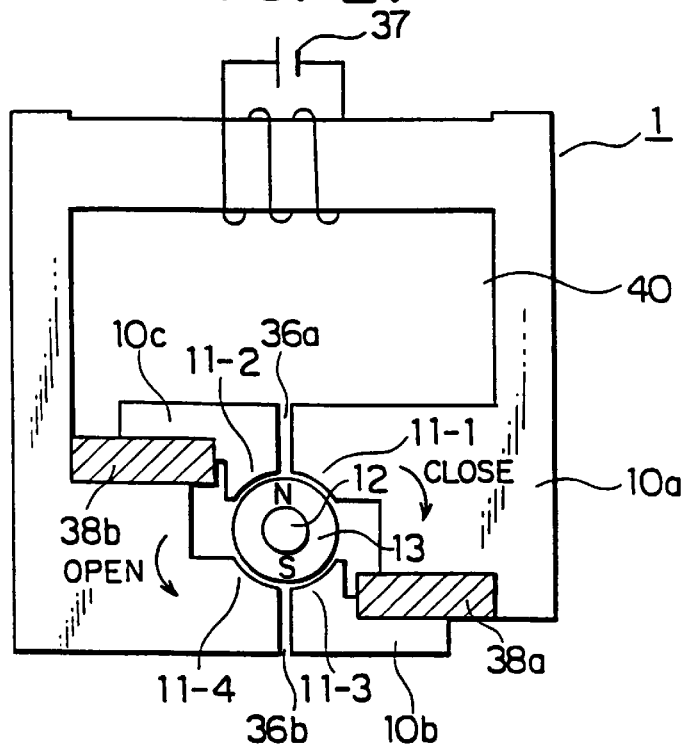
FIG. 27 shows the arrangement of a still further embodiment of the thermo-sensitive actuator according to the present invention.

FIG. 27 shows the arrangement of a still further embodiment of the thermo-sensitive actuator according to the present invention. In FIG. 27, a stator member 10a has a pair of pole pieces 11-1 and 11-4. In the center of the stator member 10a, a gap 36a is provided between the stator member 10a and a stator member 10c, and another gap 36b is provided between the stator member 10a and a stator member 10b. That is, the stator comprises three stator members 10a, 10b and 10c.

A thermo-sensitive magnetic material 38a is held between the stator members 10a and 10b, thereby being integrated with the stator. Similarly, a thermo-sensitive magnetic material 38b is held between the stator members 10a and 10c, thereby being integrated with the stator. A magnetic source 37 is connected to an upper magnetic path provided at a position which faces the rotor portion across a space 40. In the thermo-sensitive actuator of this embodiment, when the temperature is low, the thermo-sensitive magnetic materials 38a and 38b have a relatively high permeability and hence pass magnetic flux easily. Accordingly, the magnetic flux passing through the pole pieces 11-1 and 11-3 and the magnetic flux passing through the pole pieces 11-2 and 11-4 are equal to each other. However, when the temperature rises, the permeability of the thermo-sensitive magnetic materials 38a and 38b decreases. Accordingly, the rotor 13 rotates rightward to move in the valve-closing direction. It should be noted that the addition of the magnetic source 37 makes the operation even more reliable.

Figure 28:
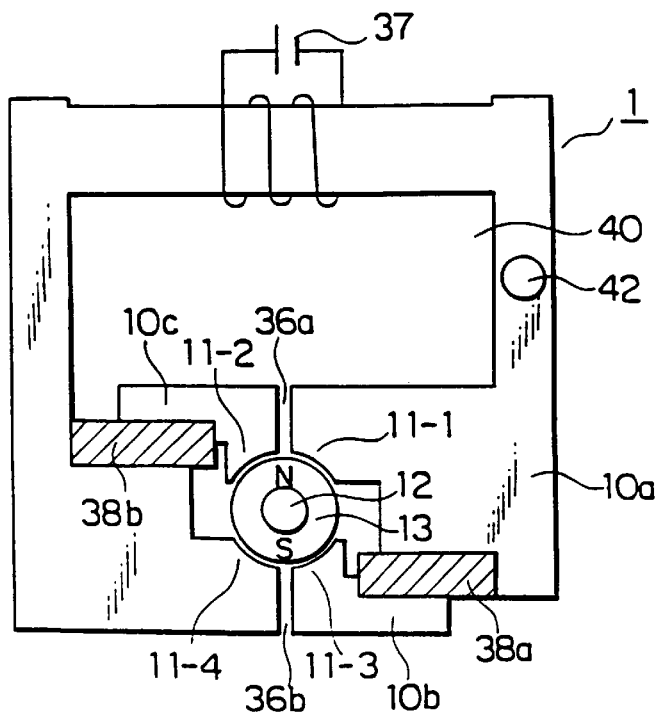
FIG. 28 shows the arrangement of a still further embodiment of the thermo-sensitive actuator according to the present invention.

FIG. 28 shows the arrangement of a still further embodiment of the thermo-sensitive actuator according to the present invention. In FIG. 28, portions which are identical or equivalent to those shown in FIG. 27 are denoted by the same reference numerals, and description thereof is omitted. In this embodiment, the thermo-sensitive actuator is arranged so that the rotor 13 lies in the center at all times. More specifically, there is a magnetic reluctance at the joint between each thermo-sensitive magnetic material and a stator member because of a junction gap produced at the joint. Accordingly, when the temperature is low, the rotor 13 is likely to rotate in the valve-opening direction slightly beyond the center position.

To compensate for the excess of rotation in the valve-opening position, a magnetic reluctance portion (referred to as "compensating portion") 42 is provided so as to cancel the magnetic reluctance of the junction gap. In this embodiment, a circular hole is provided in the magnetic path so that a desired amount of compensation is obtained by adjusting the diameter of the hole.

Figure 29:
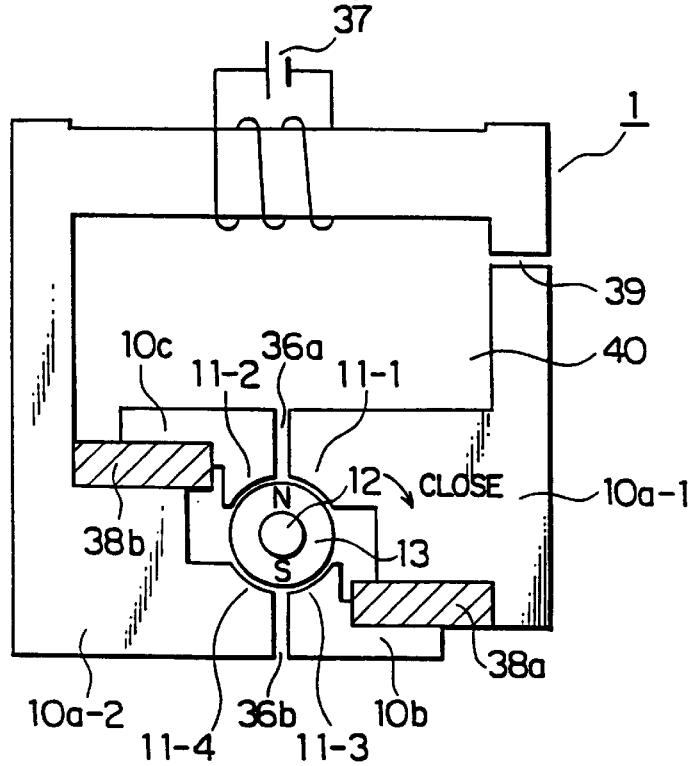
FIG. 29 shows the arrangement of a still further embodiment of the thermo-sensitive actuator according to the present invention.

FIG. 29 shows the arrangement of a still further embodiment of the thermo-sensitive actuator according to the present invention. In FIG. 29, portions which are identical or equivalent to those shown in FIG. 28 are denoted by the same reference numerals, and description thereof is omitted. In this embodiment, an air gap 39 is provided in the magnetic path as a compensating portion. In this embodiment, a desired amount of compensation is obtained by adjusting the gap length.

Figure 30:
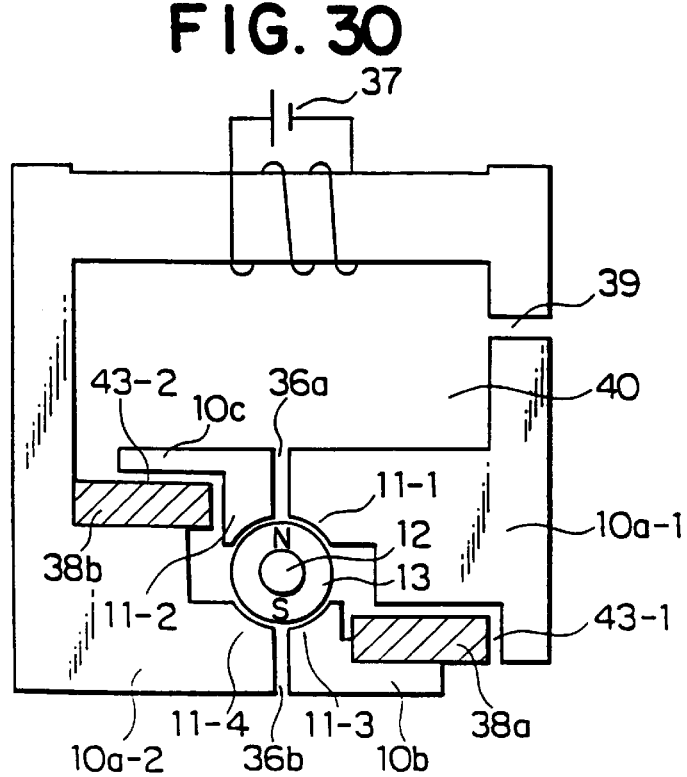
FIG. 30 shows the arrangement of a still further embodiment of the thermo-sensitive actuator according to the present invention.

FIG. 30 shows the arrangement of a still further embodiment of the thermo-sensitive actuator according to the present invention. In FIG. 30, portions which are identical or equivalent to those shown in FIG. 29 are denoted by the same reference numerals, and description thereof is omitted. Since the junction gap is very small, the air gap 39 for compensating for the junction gap must also be small.

It is difficult to form such a small air gap 39 by machining, and size variations also occur. Accordingly, predetermined gaps 43-1 and 43-2 are previously provided at respective positions of the stator members 10a–l and 10c which face the thermo-sensitive magnetic materials 38a and 38b, thereby facilitating machining of gaps for compensation, and thus minimizing the effect of the junction gap.

Figure 31:
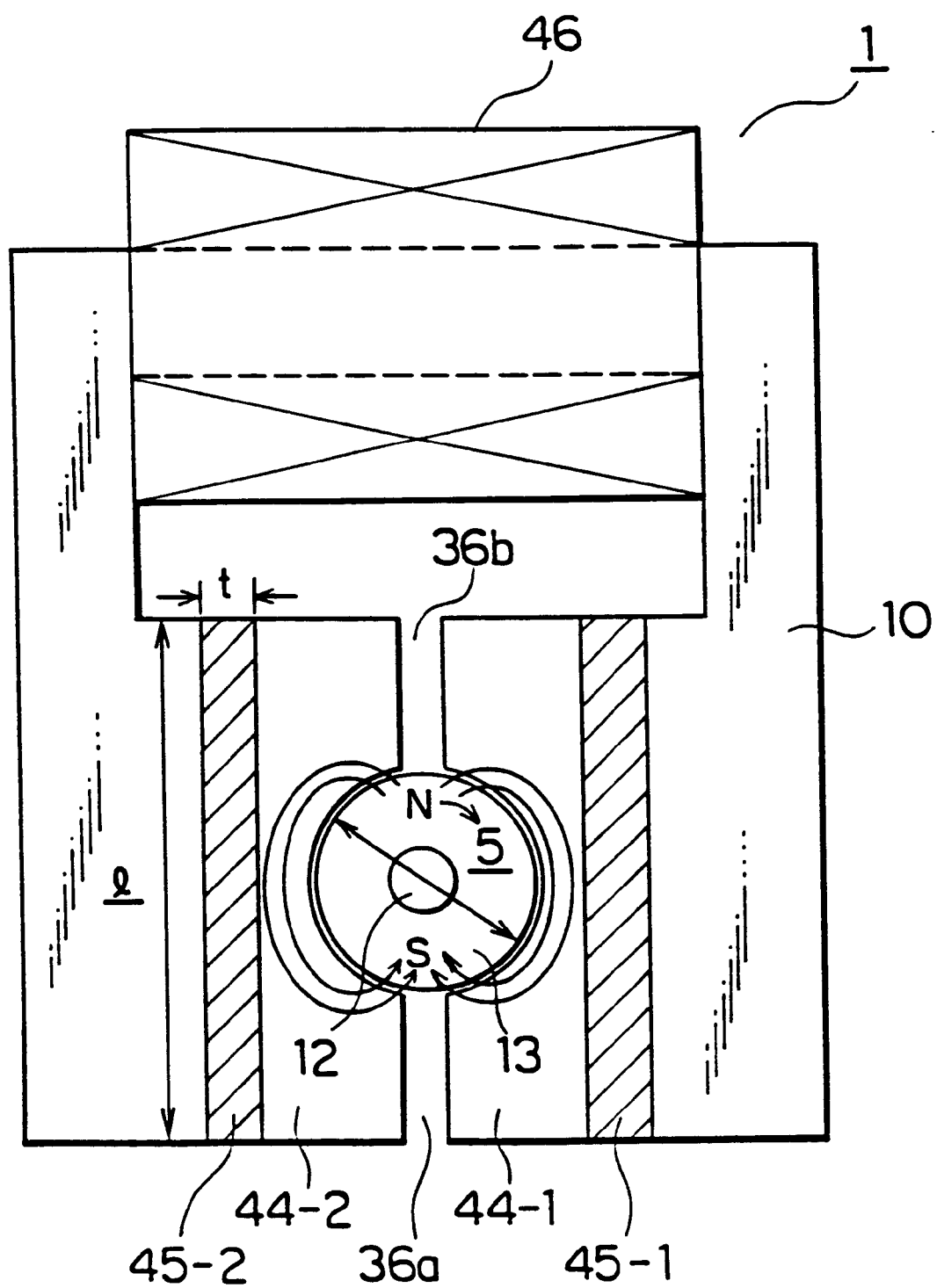
FIG. 31 shows the arrangement of a still further embodiment of the thermo-sensitive actuator according to the present invention.

FIG. 31 shows the arrangement of a still further embodiment of the thermo-sensitive actuator according to the present invention. In FIG. 31, a thermo-sensitive actuator body 1 comprises a magnetic path 10, pole pieces 44-1 and 44-2, a thermo-sensitive magnetic material 45-1 interposed between the pole piece 44-1 and the magnetic path 10, and another thermo-sensitive magnetic material 45-2 interposed between the pole piece 44-2 and the magnetic path 10.

In addition, a main air gap 5 is provided between the pole pieces 44-1 and 44-2, and a rotor 13 which is formed from a permanent magnet is disposed in the main air gap 5. The rotor 13 is rotatable through a shaft 12. Subsidiary air gaps 36a and 36b are provided at both sides of the main air gap 5. Reference numeral 46 denotes an electromagnetic coil (magnetic source).

It should be noted that the thermo-sensitive magnetic materials 45-1 and 45-2 show changes in permeability according to temperature. In this case, a thermo ferrite which passes magnetic flux easily when the temperature is low, and which becomes paramagnetic when the temperature rises to the Curie point of the material, or magnetic shunt material of Japanese Patent Publication No. 49-19560, is used as the thermo-sensitive magnetic materials 45-1 and 45-2. Although in this embodiment two thermo-sensitive magnetic materials 45-1 and 45-2 are provided, it should be noted that either of them may be omitted.

Next, the operation of this embodiment will be explained.

First, when the electromagnetic coil 46 is not energized, the rotor 13 remains stationary at the illustrated position. The reason for this is as follows: Magnetic flux from the north pole of the rotor 13 returns to the south pole through the main air gap 5 and the pole pieces 44-1 and 44-2. At this time, there is no magnetic flux in the subsidiary air gaps 36*a* and 36*b*. That is, this state is the most stable in terms of magnetism.

Next, when the electromagnetic coil 46 is energized, magnetic flux from the magnetic source passes through a path comprising the magnetic path 10, the thermo-sensitive magnetic material 45-1, the pole piece 44-1, the subsidiary air gap 36*a* or 36*b*, the pole piece 44-2, the thermo-sensitive magnetic material 45-2 and the magnetic path 10. Accordingly, the rotor 13 rotates in a direction in which the magnetic energy in the subsidiary air gaps 36*a* and 36*b* is canceled, and comes to rest at a position where the magnetic energy in the subsidiary air gaps 36*a* and 36*b* is zero, that is, where magnetic flux passing through the subsidiary air gaps 36*a* and 36*b* is zero.

Accordingly, if this actuator is placed in an engine room of an automobile, when the temperature rises in accordance with the warming-up condition of the engine, the thermo-sensitive magnetic materials 45-1 and 45-2 become reluctant to pass magnetic flux. In a heater, the magnetic reluctance changes according to the environmental temperature. This means that the effect of the electromagnetic force produced by the electromagnetic coil 46 on the permanent magnet constituting the rotor 13 reduces.

Accordingly, even if the value of current flowing through the electromagnetic coil 46 is kept constant, as the temperature rises, the rotor 13 moves toward the position assumed by the rotor 13 when the coil 46 is not energized. The amount of movement of the rotor 13 is determined by the thickness t and cross-sectional area ι of each of the thermo-sensitive magnetic materials 45-1 and 45-2.

According to this embodiment, when the electromagnetic coil 46 is not energized, the rotor 13 remains stationary at a position where it is in the most stable state, that is, the rotor 13 is at rest in a position where the north and south poles of the rotor 13 faces toward the subsidiary air gaps 36*b* and 36*a*, as shown in FIG. 31, irrespective of the temperature. Even when the temperature rises, the rotor 13 is allowed to come to rest in the above-described stable position by the action of the thermo-sensitive magnetic materials 45-1 and 45-2. This means that the rotor 13 is placed in a normally closed state.

As will be understood from the foregoing description, the stable state of the rotor 13 is a state where no magnetic flux flows through either of the subsidiary air gaps 36*a* and 36*b*. In designing of this type of magnetic circuit, generally, the flow of magnetism is calculated by a finite element analysis program running on a computer, and a torque induced in the rotor is further calculated. In addition, a state where the induced torque is zero is arithmetically obtained, thereby grasping the characteristics of the actuator.

In this regard, calculation of a torque requires a high-performance computer. However, the above-described embodiment enables the characteristics of the actuator to be grasped with only the result of calculation of the flow of magnetism in the case of a stable position of the rotor. In this case, a relatively accurate result can be obtained in the calculation of the flow of magnetism even with a small-scale computer. Consequently, it is possible to shorten the development time and improve the design quality.

Figure 32:
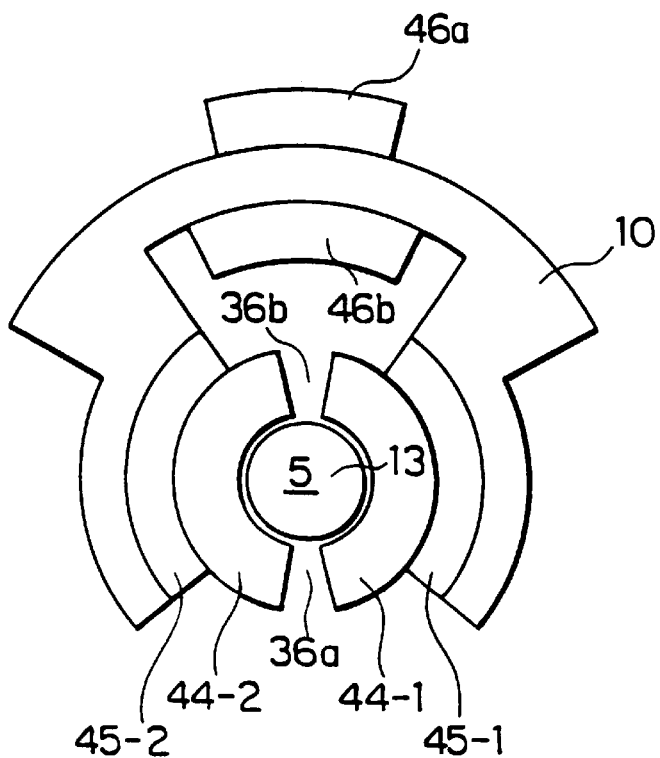
FIG. 32 shows a model for an analysis by the finite element method.

FIG. 32 shows the configuration of a model for analyzing the magnetic field in a motor by the finite element method. It should be noted that the configuration shown in FIG. 32 is owing to the fact that the analytic model is inputted on the basis of the system of polar coordinates. In FIG. 32, portions which correspond to the constituent elements shown in FIG. 31 are denoted by the same reference numerals.

Figure 33:
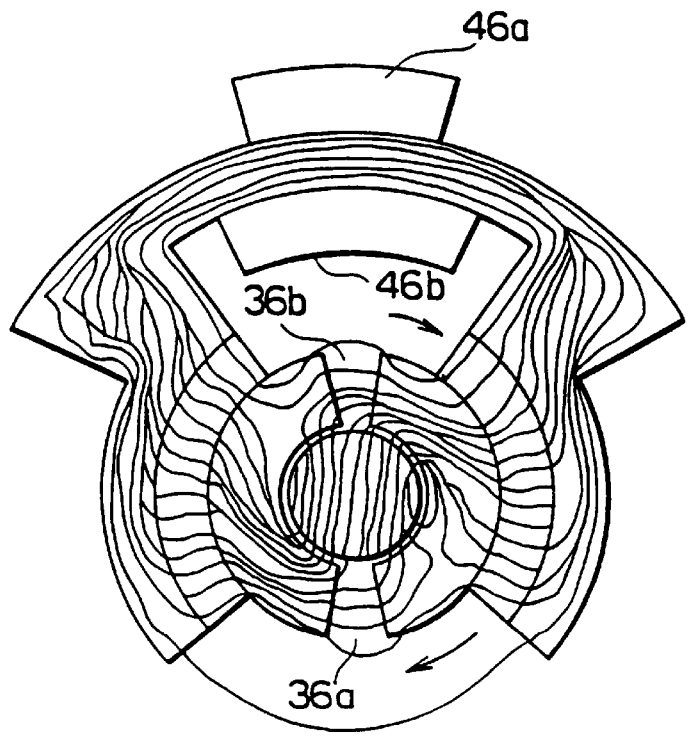
FIG. 33 shows a rotating state of a rotor obtained as a result of an analysis.

FIG. 33 shows the result of an analysis made by using the model shown in FIG. 32. In this case, the electromagnetic coil 46 is in an energized state. As shown in FIG. 33, flows of magnetic flux from the pole piece 44-2 to the pole piece 44-1 through the subsidiary air gaps 36*a* and 36*b* are observed, and it will be understood that a torque is induced in the rotor 13, causing the rotor 13 to rotate in the direction of the arrows.

Figure 34:
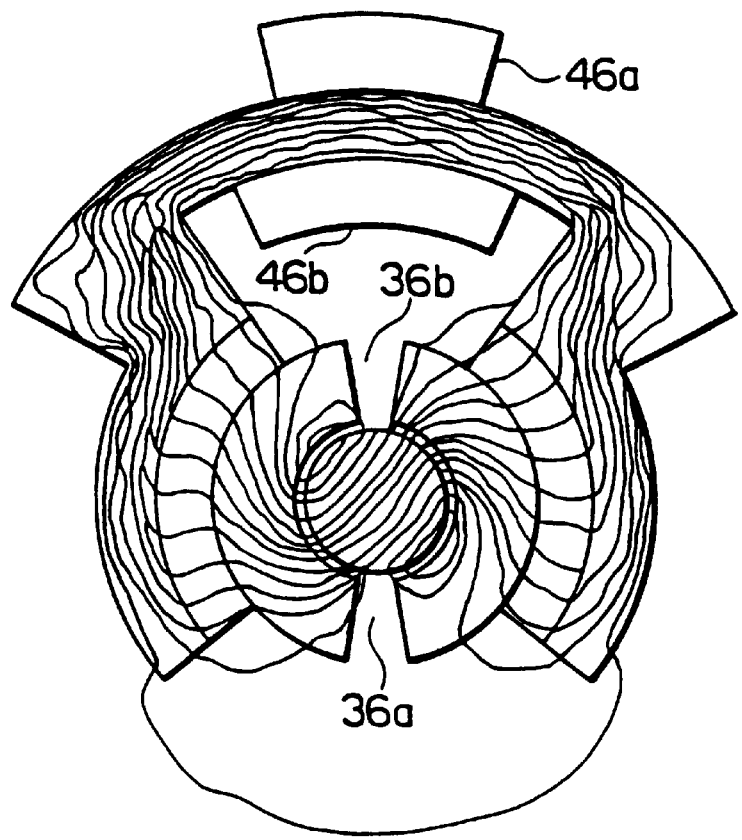
FIG. 34 shows a stable (stationary) state of a rotor obtained as a result of an analysis.

FIG. 34 shows a state where the rotor 13 is at rest in the most stable position. When the rotor 13 which is in the state shown in FIG. 33 is rotated, the magnetic flux passing through the subsidiary air gaps 36*a* and 36*b* becomes zero when a predetermined position is reached. At this position, a torque induced in the rotor 13 is zero, and this is the position where the rotor 13 comes to rest.

FIG. 34 verifies that the rotor 13 is in a stationary position. Thus, it will be understood that a stationary position of the rotor 13 can be obtained simply by observing magnetic flux in the subsidiary air gaps 36*a* and 36*b* without the need of calculating a torque induced in the rotor 13. It should be noted that FIG. 33 shows the relationship between a rotating state of the rotor 13 and the flow of magnetic flux in this state, and FIG. 34 shows the relationship between a stable (stationary) state of the rotor 13 and the flow of magnetic flux in this state.

Figure 35:
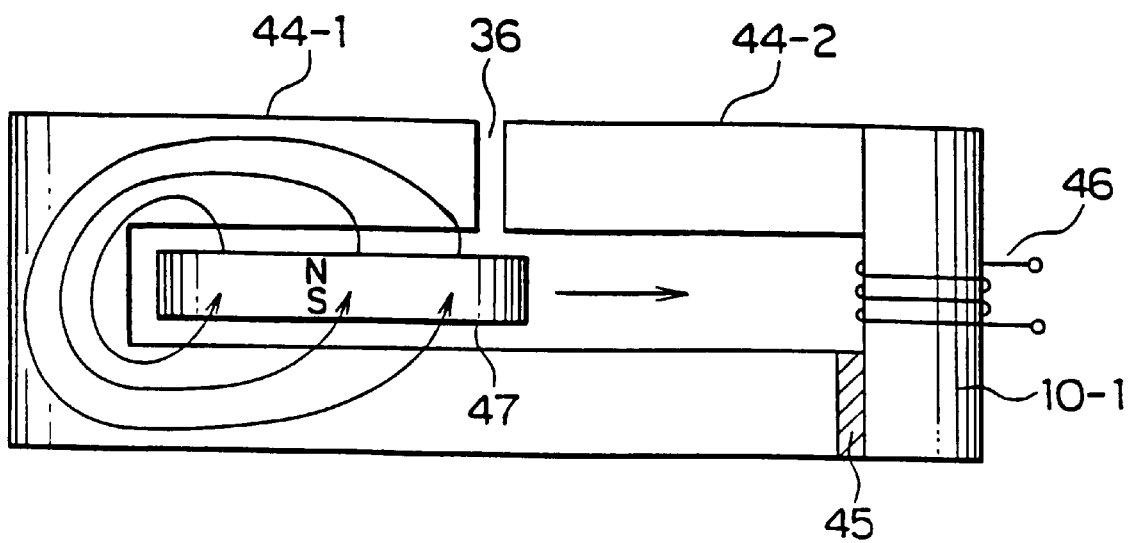
FIG. 35 shows the arrangement of a still further embodiment of the present invention.

FIG. 35 shows the arrangement of a still further embodiment of the thermo-sensitive actuator according to the present invention. In FIG. 35, portions which have the same functions as those shown in FIG. 31 are denoted by the same reference numerals. In this embodiment, the actuator is arranged in a direct acting form as a whole. Accordingly, a subsidiary air gap 36 is provided between pole pieces 44-1 and 44-2, and a thermo-sensitive magnetic material 45 is interposed between a magnetic path 10-1, which is provided with an electromagnetic coil 46, and the pole piece 44-1. Reference numeral 47 denotes a moving member.

Next, the operation will be explained.

First, when no electric current is flowing through the electromagnetic coil 46, a magnetic path is formed from the north pole of the moving member 47 to the south pole thereof through the pole piece 44-1. At this time, no magnetic flux flows through the subsidiary air gap 36. Thus, the actuator is in a stable state in the same way as in the case of FIG. 31. Accordingly, the moving member 47 is at rest in the illustrated position.

To cause the moving member 47 to move in the direction of the arrow, an electric current is passed through the electromagnetic coil 46. Consequently, the moving member 47 moves and comes to rest at a predetermined position. The movement of the moving member 47 will be explained below with reference to FIG. 36. Let us consider a case where the moving member 47 has been moved to the illustrated position by external force with no current passed through the electromagnetic coil 46.

In this state, magnetic flux passes through the pole piece 44-2 and via the subsidiary air gap 36 and the thermo-sensitive magnetic material 45, as illustrated in the figure. At this time, energy stored in the subsidiary air gap 36 acts as reaction force in a direction in which the energy is reduced, that is, as force that causes the moving member 47 to return to the left.

Figure 37:
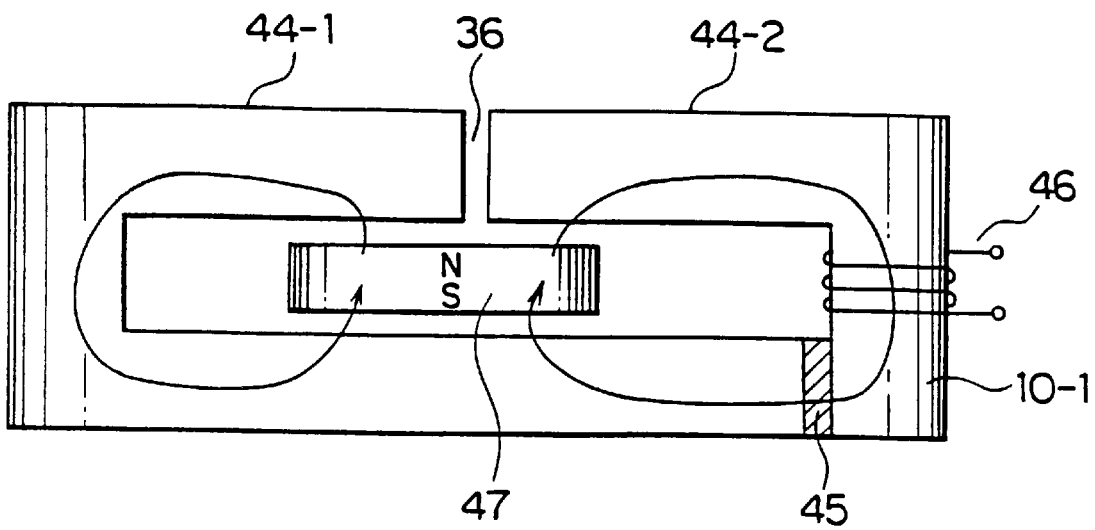
FIG. 37 illustrates a stable state in an operation of the embodiment shown in FIG. 35.

When a predetermined current is passed through the electromagnetic coil 46, as shown in FIG. 37, all the magnetic flux passing through the subsidiary air gap 36 flows through the thermo-sensitive magnetic material 45. As a result, magnetic energy in the subsidiary air gap 36 becomes zero, and thus a stable state is established.

Figure 36:
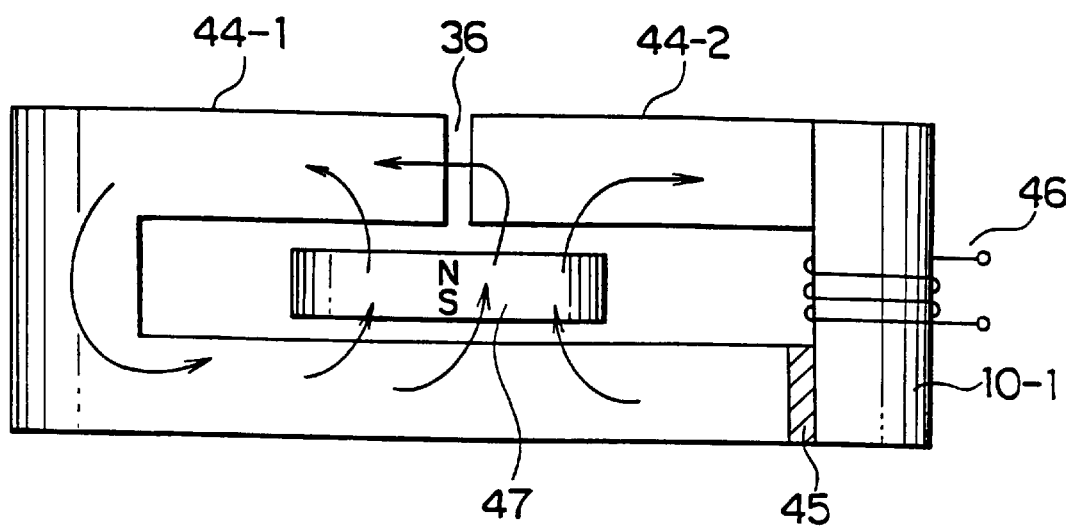
FIG. 36 illustrates reaction force acting in an operation of the embodiment shown in FIG. 35.

In the foregoing, how reaction force is produced and then made zero to stop the moving member 47 by energizing the coil 46 has been described with reference to FIGS. 35, 36 and 37. It should, however, be noted that the electromagnetic coil 46 must be energized to move the moving member 47, as a matter of course.

Further, as the temperature rises, the thermo-sensitive magnetic material 45 becomes reluctant to pass magnetic flux, as has already been described. When the temperature reaches a predetermined Curie point, the effect of the electromagnetic coil 46 reduces, and the amount of movement decreases. When the electromagnetic coil 46 is not energized, the fully-closed position of the valve is held in a stable state.

As has been described above, this embodiment not only enables the rotor to assume a position for closing the valve irrespective of the temperature when the coil is not energized, but also makes it possible to analyze the characteristics of the actuator simply by calculating the flow of magnetism. Accordingly, it is possible to shorten the development time and facilitate the design of the actuator.

What is claimed is:

1. A thermo-sensitive actuator having a stator made of magnetic material to form a yoke, a rotor rotatably provided in an opening provided in said stator, pole pieces for magnetically connecting said stator and rotor, and at least one magnetic source disposed in any of said constituent elements, said thermo-sensitive actuator comprising:
    a thermo-sensitive magnetic material which shows a change in magnetic characteristics according to temperature, said thermo-sensitive magnetic material being provided in a part of a magnetic path.

2. A thermo-sensitive actuator having a stator made of a magnetic material to form a yoke, an electromagnetic coil provided on said stator, and a rotor which is a cylindrical magnet rotatably provided in an eccentric opening provided in said stator, so that a torque is induced in said rotor by a magnetic flux produced by said cylindrical magnet rotor and a magnetic flux produced by said electromagnetic coil, said thermo-sensitive actuator comprising:
    a thermo-sensitive magnetic material having either negative or positive characteristics which is disposed in each of magnetic flux paths which face each other across said eccentric opening; or a first pair of thermo-sensitive magnetic materials having negative characteristics which are disposed in magnetic flux paths which face each other across said eccentric opening, and a second pair of thermo-sensitive magnetic materials having positive characteristics which are disposed in magnetic flux paths which face each other across said eccentric opening so that a mutual center line of said first pair of thermo-sensitive magnetic materials intersects a mutual center line of said second pair of thermo-sensitive magnetic materials.

3. A thermo-sensitive actuator according to claim 2, wherein said thermo-sensitive magnetic material has either negative or positive characteristics, and is provided in only one of magnetic flux paths which face each other across said eccentric opening.

4. A thermo-sensitive actuator according to claim 1, wherein said thermo-sensitive magnetic material is provided in only a part of each of a pair of pole pieces.

5. A thermo-sensitive actuator according to claim 1, wherein said thermo-sensitive magnetic material is provided in only a part of each of a pair of pole pieces, and said stator is provided with a permanent magnet as a magnetic source.

6. A thermo-sensitive actuator according to claim 1, wherein said rotor is a permanent magnet, said magnet having a thermo-sensitive magnetic material attached to each end thereof.

7. A thermo-sensitive actuator according to claim 1, wherein each pair of opposing pole pieces are formed by using a thermo-sensitive magnetic material having negative or positive characteristics so that different pairs of opposing pole pieces have different thermo-sensitive magnetic characteristics.

8. A thermo-sensitive actuator according to claim 1, wherein said thermo-sensitive magnetic material is a permanent magnet in which magnetomotive force considerably changes according to temperature, said thermo-sensitive magnetic material being combined with a permanent magnet in which magnetomotive force is stable according to temperature.

9. A thermo-sensitive actuator according to claim 1, wherein said rotor comprises a combination of an ordinary magnetic material and a thermo-sensitive magnetic material of negative characteristics, a combination of an ordinary magnetic material and a thermo-sensitive magnetic material of positive characteristics, and a combination of a thermo-sensitive magnetic material of negative characteristics and a thermo-sensitive magnetic material of positive characteristics, and said stator is provided with a permanent magnet as a magnetic source.

10. A thermo-sensitive actuator having a stator made of a magnetic material to form a yoke, a rotor which is a permanent magnet rotatably provided in an opening provided in said stator, and pole pieces for magnetically connecting said stator and rotor, said thermo-sensitive actuator comprising:
    a thermo-sensitive magnetic material which is provided in a part of each of rotor-side end surfaces of at least one pair of pole pieces which face each other across said rotor.

11. A thermo-sensitive actuator according to claim 10, further comprising:
    a gap provided by cutting a magnetic path of said stator; and
    a magnetic source provided in said magnetic path.

* * * * *